US010596953B2

(12) United States Patent
Rikimaru

(10) Patent No.: US 10,596,953 B2
(45) Date of Patent: *Mar. 24, 2020

(54) DISPLAY DEVICE FOR VEHICLE

(71) Applicant: STANLEY ELECTRIC CO., LTD., Tokyo (JP)

(72) Inventor: Motoko Rikimaru, Tokyo (JP)

(73) Assignee: STANLEY ELECTRIC CO., LTD., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/231,788

(22) Filed: Dec. 24, 2018

(65) Prior Publication Data
US 2019/0202341 A1 Jul. 4, 2019

(30) Foreign Application Priority Data

Jan. 4, 2018 (JP) .................. 2018-000320

(51) Int. Cl.
B60Q 1/08 (2006.01)
G06K 9/00 (2006.01)
(Continued)

(52) U.S. Cl.
CPC .............. B60Q 1/085 (2013.01); B60Q 1/50 (2013.01); B60Q 9/008 (2013.01); B60W 30/16 (2013.01);
(Continued)

(58) Field of Classification Search
CPC .......... B60Q 1/085; B60Q 1/50; B60Q 9/008; F21S 43/40; F21S 43/31; F21S 43/26; B60W 30/16; G03B 21/28
See application file for complete search history.

(56) References Cited

U.S. PATENT DOCUMENTS 5,281,815 A 1/1994 Even-Tov
2008/0055920 A1* 3/2008 Okada ..................... F21S 41/17
362/539
(Continued)

FOREIGN PATENT DOCUMENTS

DE 102008003451 A1 2/2009
DE 102012024494 A1 6/2014
(Continued)

OTHER PUBLICATIONS

The extended European Search Report for the related European Patent Application No. 18215486.4 dated May 31, 2019.
(Continued)

Primary Examiner — Mary Ellen Bowman
(74) Attorney, Agent, or Firm — Kenealy Vaidya LLP

(57) ABSTRACT

A display device for a vehicle includes a light source, an image generating section configured to modulate light emitted from the light source using an image according to an inter-vehicle distance between a host vehicle and a preceding vehicle and generate an image according to the inter-vehicle distance, a condensing optical system configured to condense light having information representing the image according to the inter-vehicle distance generated by the image generating section, and a reflecting section configured to reflect the light condensed by the condensing optical system and project the light to a road surface, wherein the reflecting section has a reflecting surface with a curvature that gradually increases from a rear side in a projecting direction toward a front side in the projecting direction.

20 Claims, 20 Drawing Sheets

(51) Int. Cl.
    *B60Q 9/00*           (2006.01)
    *B60W 30/16*        (2020.01)
    *B60Q 1/50*           (2006.01)
    *F21S 43/31*         (2018.01)
    *F21S 43/20*         (2018.01)
    *F21S 43/40*         (2018.01)
    *G03B 21/28*         (2006.01)
    *G03B 21/00*         (2006.01)

(52) U.S. Cl.
    CPC ............... *F21S 43/26* (2018.01); *F21S 43/31* (2018.01); *F21S 43/40* (2018.01); *G06K 9/00798* (2013.01); *B60Q 2300/14* (2013.01); *B60Q 2300/20* (2013.01); *B60Q 2300/32* (2013.01); *B60Q 2300/41* (2013.01); *B60Q 2300/45* (2013.01); *B60Q 2400/50* (2013.01); *G03B 21/008* (2013.01); *G03B 21/28* (2013.01)

(56) References Cited

U.S. PATENT DOCUMENTS

2014/0362195 A1* 12/2014 Ng-Thow-Hing ........................... G06K 9/00791 348/51
2015/0029474 A1   1/2015  Tatsuno
2016/0090023 A1   3/2016  Asaoka
2017/0144591 A1   5/2017  Yatsu
2018/0154819 A1* 6/2018  Hoshino ................. B60Q 1/085
2018/0170373 A1* 6/2018  Kwon ............... B60W 30/0956

FOREIGN PATENT DOCUMENTS

| EP | 3203140 A1 | 8/2017 |
|---|---|---|
| EP | 3339919 A1 | 6/2018 |
| FR | 2967625 A1 | 5/2012 |
| JP | 4059079 B | 3/2008 |
| JP | 2010-211404 A | 9/2010 |
| JP | 2015-164828 A | 9/2015 |
| JP | 2016-107761 A | 6/2016 |
| WO | 2015/193996 A1 | 12/2015 |
| WO | 2016/051490 A1 | 4/2016 |

OTHER PUBLICATIONS

The extended European Search Report for the related European Patent Application No. 17205347.2 dated May 28, 2018.
Japanese Office Action for the related Japanese Patent Application No. 2016-237432 dated Feb. 6, 2018.

\* cited by examiner

FIG. 5A 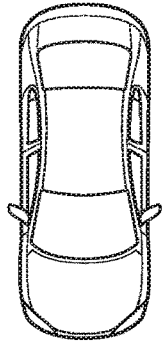 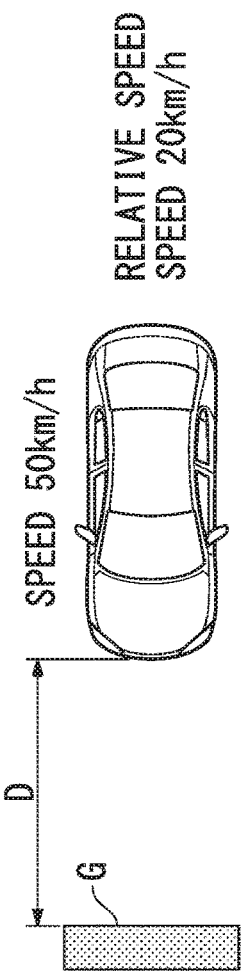
FIG. 5B 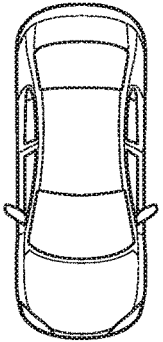 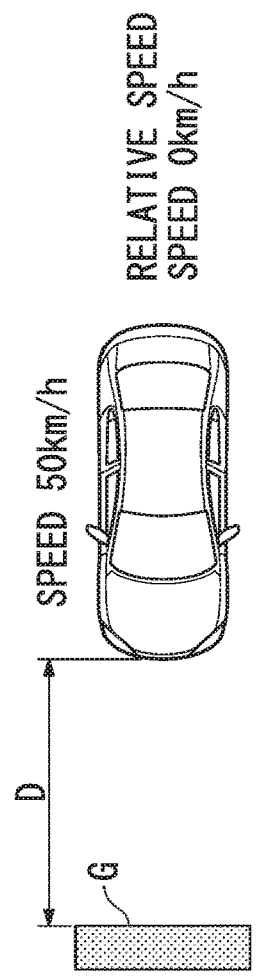
FIG. 5C 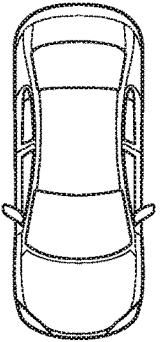 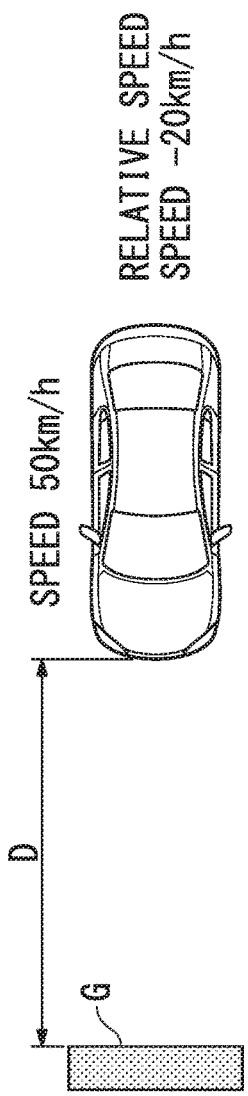

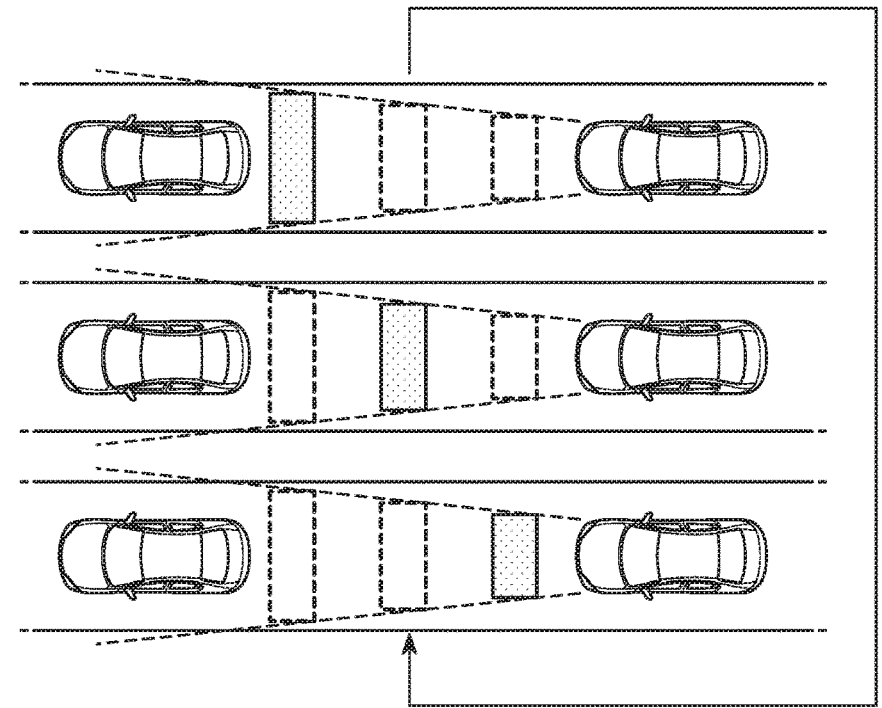

FIG. 13
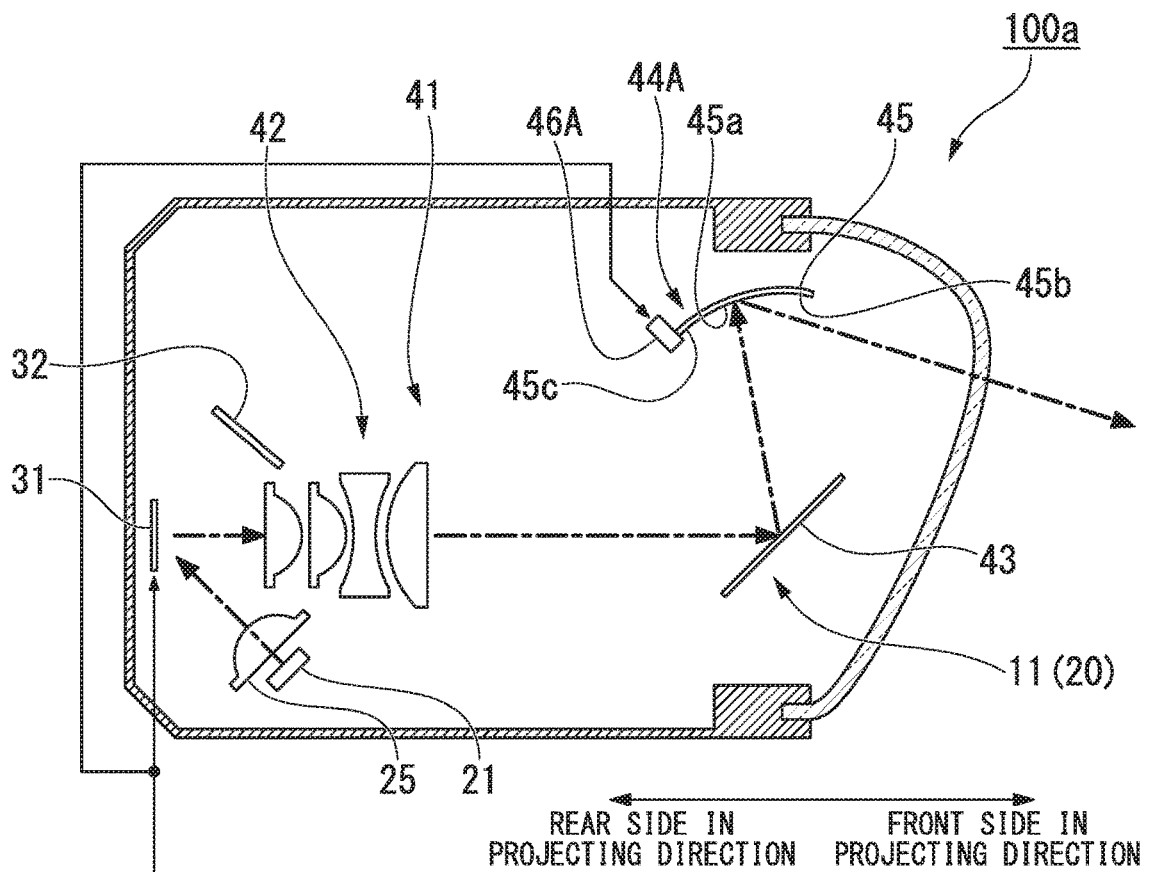
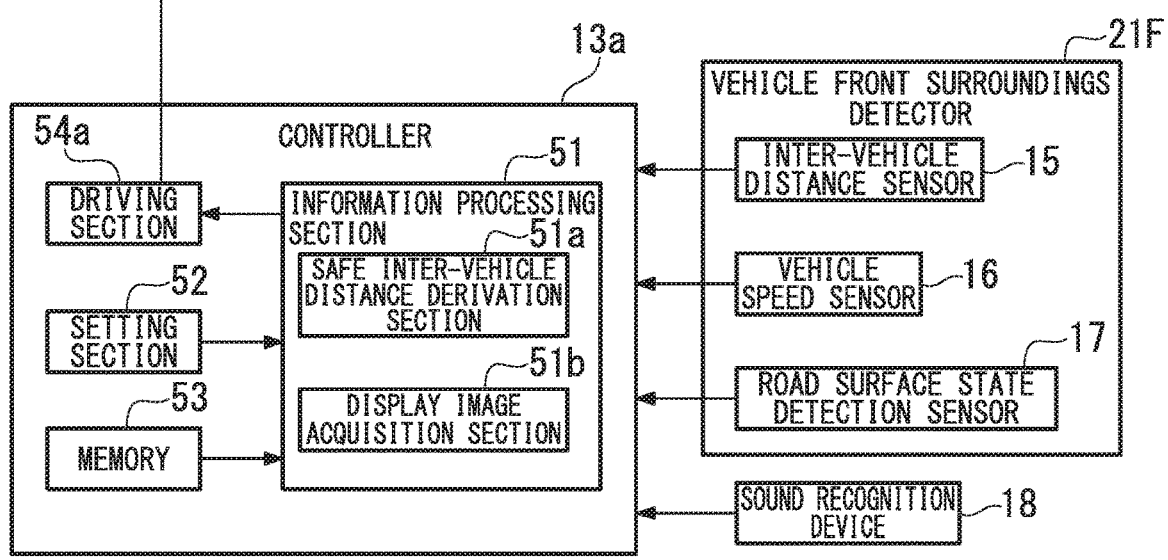

DISPLAY DEVICE FOR VEHICLE

CROSS-REFERENCE TO RELATED APPLICATION

Priority is claimed on Japanese Patent Application No. 2018-000320, filed Jan. 4, 2018, the content of which is incorporated herein by reference.

BACKGROUND IF THE INVENTION

Field of the Invention

The present invention relates to a display device for a vehicle.

Description of Related Art

In order to promote a driver in a host vehicle to secure art inter-vehicle distance with respect to a preceding vehicle, an on-vehicle display device configured to display various images on a road surface is known (for example, see Japanese Unexamined Patent Application, First Publication No. 2010-211404).

The on-vehicle display device detects an inter-vehicle distance, and changes a display image on a road surface on the basis of the detected inter-vehicle distance. For example, the on-vehicle display device may change characters, colors, positions, patterns, or the like.

In addition, an on-vehicle display device may change a position of a display image on a road surface toward a side closer to a host vehicle when the vehicle traveling environment indicates any one of rainy weather, an urban district, and a mountainous route. For this reason, a display image on a road surface moves back and forth between the host vehicle and the preceding vehicle according to an inter-vehicle distance between the host vehicle and the preceding vehicle or a traveling environment.

SUMMARY OF THE INVENTION

Moving a display image on a road surface back and forth between a host vehicle and a preceding vehicle is performed by moving an irradiation position on the road surface. For this reason, a lens imaging plane may not coincide with the road surface, and thus, the display image on the road surface may be blurred.

If the display image on the road surface is blurred, there is concern that, even when a safe inter-vehicle distance from the preceding vehicle is displayed on the road surface, the distance may not be able to be accurately recognized by a driver.

An aspect of the present invention is directed to providing a display device for a vehicle capable of clearly displaying an image on a road surface according to an inter-vehicle distance.

A display device for a vehicle according to an aspect of the present invention includes a light source; an image generating section configured to modulate light emitted from the light source using an image according to an inter-vehicle distance between a host vehicle and a preceding vehicle and generate an image according to the inter-vehicle distance; a condensing optical system configured to condense light having information representing the image according to the inter-vehicle distance generated by the image generating section; and a reflecting section configured to reflect the light condensed by the condensing optical system and project the light to a road surface, wherein the reflecting section has a reflecting surface with a curvature that gradually increases from a rear side in a projecting direction toward a front side in the projecting direction.

The display device for a vehicle of the aspect of the present mention may include an utter-vehicle distance sensor configured to derive an inter-vehicle distance between the host vehicle and the preceding vehicle; a vehicle speed sensor configured to derive a speed of the host vehicle; and a controller configured to acquire information showing a safe inter-vehicle distance between the host vehicle and the preceding vehicle on the basis of the inter-vehicle distance and the speed of the host vehicle, wherein the image generating section may generate an image representing the safe inter-vehicle distance on the basis of the information showing the safe inter-vehicle distance acquired by the controller.

In the display device for a vehicle according to the aspect of the present invention, the controller may derive a relative speed of the host vehicle with respect to the preceding vehicle on the basis of the inter-vehicle distance and the speed of the host vehicle, and may acquire information showing a safe inter-vehicle distance as an image according to the derived relative speed.

In the display device for a vehicle according to the aspect of the present invention, the controller may acquire information showing a safe inter-vehicle distance as an image according to the inter-vehicle distance when a distance between the host vehicle and the preceding vehicle is larger than a threshold.

The display device for a vehicle according to the aspect of the present invention may include a road surface state detection sensor configured to detect a state of a road surface on which the host vehicle travels, wherein the controller may acquire information showing a safe inter-vehicle distance also on the basis of the road surface state detected by the road surface state detection sensor.

The display device for a vehicle of the aspect of the present invention may include a plurality of reflecting sections configured to reflect light toward regions on a road surface having different distances from each other; and a switching section configured to switch and to dispose one of the plurality of reflecting sections to a light receiving position of light radiated from the condensing optical system, wherein the controller may select the reflecting section from the plurality of reflecting sections to be switched and to be disposed at the light receiving position of light radiated from the condensing optical system.

The display device for a vehicle of the aspect of the present invention may include a setting section configured to perform permission or prohibition of generation of an image according to the inter-vehicle distance by the image generating section, wherein, the image generating section may generate an image representing the inter-vehicle distance when the setting section permits generation of the image according to the inter-vehicle distance.

In the display device for a vehicle of the aspect of the present invention, when the light source is a laser, the controller may have a function of predicting whether the host vehicle will collide with the preceding vehicle, and turn off the light source when a collision is predicted.

According to the aspect of the present invention, it is possible to provide a display device for a vehicle capable of clearly displaying an image according to an inter-vehicle distance on a road surface.

BRIEF DESCRIPTION OF THE DRAWINGS

FIG. 5A is a view showing an example of derivation of a safe inter-vehicle distance.

FIG. 5B is a view showing an example of derivation of a safe inter-vehicle distance.

FIG. 5C is a view showing an example of derivation of a safe inter-vehicle distance.

FIG. 9A is a view showing an example of a display image displayed on a mad surface by the display device for a vehicle according to the first embodiment.

FIG. 9B is a view showing an example of a display image displayed on a road surface by the display device for a vehicle according to the first embodiment.

FIG. 9C is a view showing an example of a display image displayed on a road surface by the display device for a vehicle according to the first embodiment.

FIG. 9D is a view showing an example of a display image displayed on a road surface by the display device for a vehicle according to the first embodiment.

FIG. 9E is a view showing an example of a display image displayed on a road surface by the display device for a vehicle according to the first embodiment.

FIG. 13 is a schematic view of a display device for a vehicle according to a second embodiment.

DETAILED DESCRIPTION OF THE INVENTION

Figure 1:
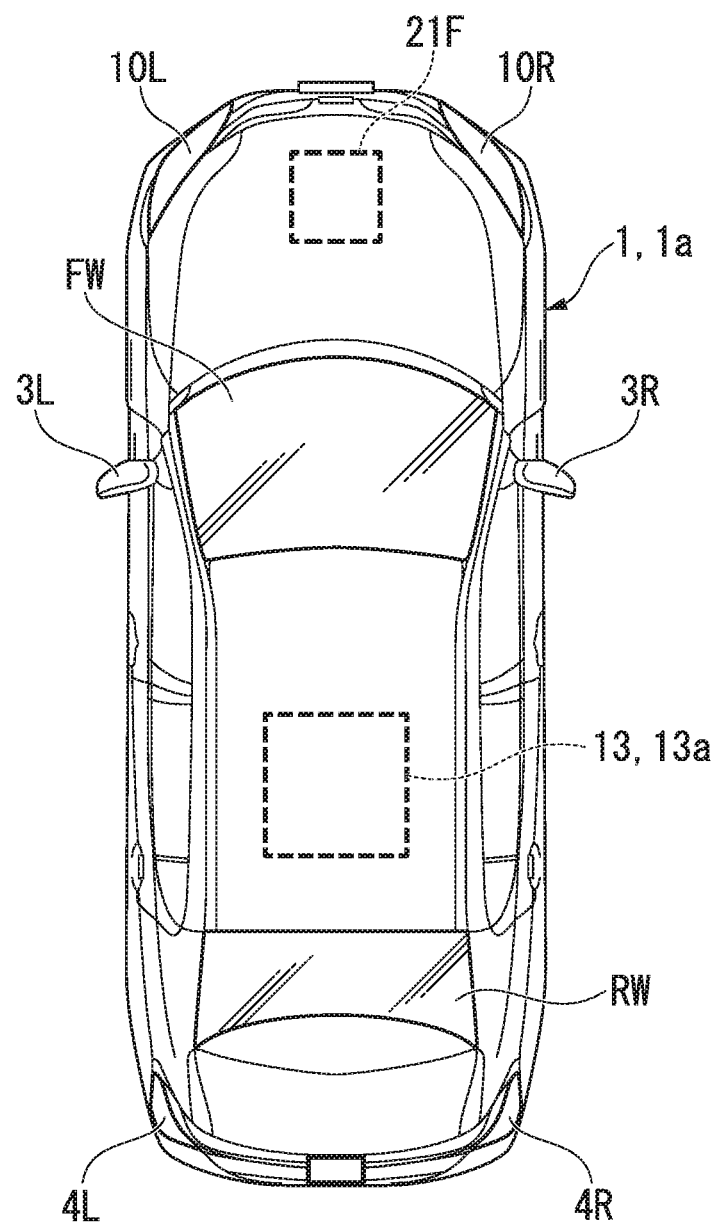
FIG. 1 is a view showing a schematic configuration of an automobile according to a first embodiment.

Next, a display device for a vehicle according to embodiments will be described with reference to the accompanying drawings. The embodiments described below are merely exemplary and the embodiments to which the present invention is applied are not limited to the following embodiments.

Further, in the drawings for describing the embodiments, components having the same functions are designated by the same reference numerals, and repeated description thereof will be omitted.

In addition, "on the basis of XX" disclosed herein means "on the basis of at least XX," and also includes the case of on the basis of another element in addition to XX. "On the basis of XX" is not limited to the case in which XX is directly used and also includes the case of on the basis of an element obtained by performing calculation or processing with respect to XX.

"XX" is an arbitrary element (for example, arbitrary information).

Hereinafter, embodiments of the present invention will be described with reference to the accompanying drawings.

First Embodiment

A display device for a vehicle according to a first embodiment is mounted on a vehicle. In the embodiment, while an automobile is shown as an example of the vehicle, a motorcycle, a bicycle, a micro-miniature mobility vehicle, a personal mobility vehicle, or the like, may be provided as the vehicle.

[Schematic Configuration of Automobile]

FIG. 1 is a view showing a schematic configuration of an automobile 1 according to the first embodiment.

The automobile 1 includes a headlight on a left side (in the embodiment, referred to as a left headlight section 10L), a headlight on a right side (in the embodiment, referred to as a right headlight section 10R), a tail light on a left side (in the embodiment, referred to as a left tail light section 4L), a tail light on a right side (in the embodiment, referred to as a right tail light section 4R), a sideview mirror on a left side (in the embodiment, referred to as a left sideview mirror 3L), a sideview mirror on a right side (in the embodiment, referred to as a right sideview mirror 3R), a front window FW, and a rear window RW.

The left headlight section 10L is disposed on a left side of a front side of the automobile 1, and the right headlight section 10R is disposed on a right side of the from side of the automobile 1. The left tail light section 4L is disposed on a left side of a rear side of the automobile 1, and the right tail light section 4R is disposed on a right side of the rear side of the automobile 1. In addition, the automobile 1 includes a vehicle surroundings detector on a front side (in the embodiment, referred to as a vehicle front surroundings detector 21F), and, a controller 13.

Here, in the embodiment, while a part of a configuration section of the automobile 1 is shown, for example, in addition thereto, an arbitrary configuration section such as another configuration section or the like conventionally provided in a general automobile may be provided.

In addition, the vehicle front surroundings detector 21F and a part of or the entire controller 13 may not be visible on an exterior of the automobile 1 and may be provided inside the automobile 1.

Figure 2:
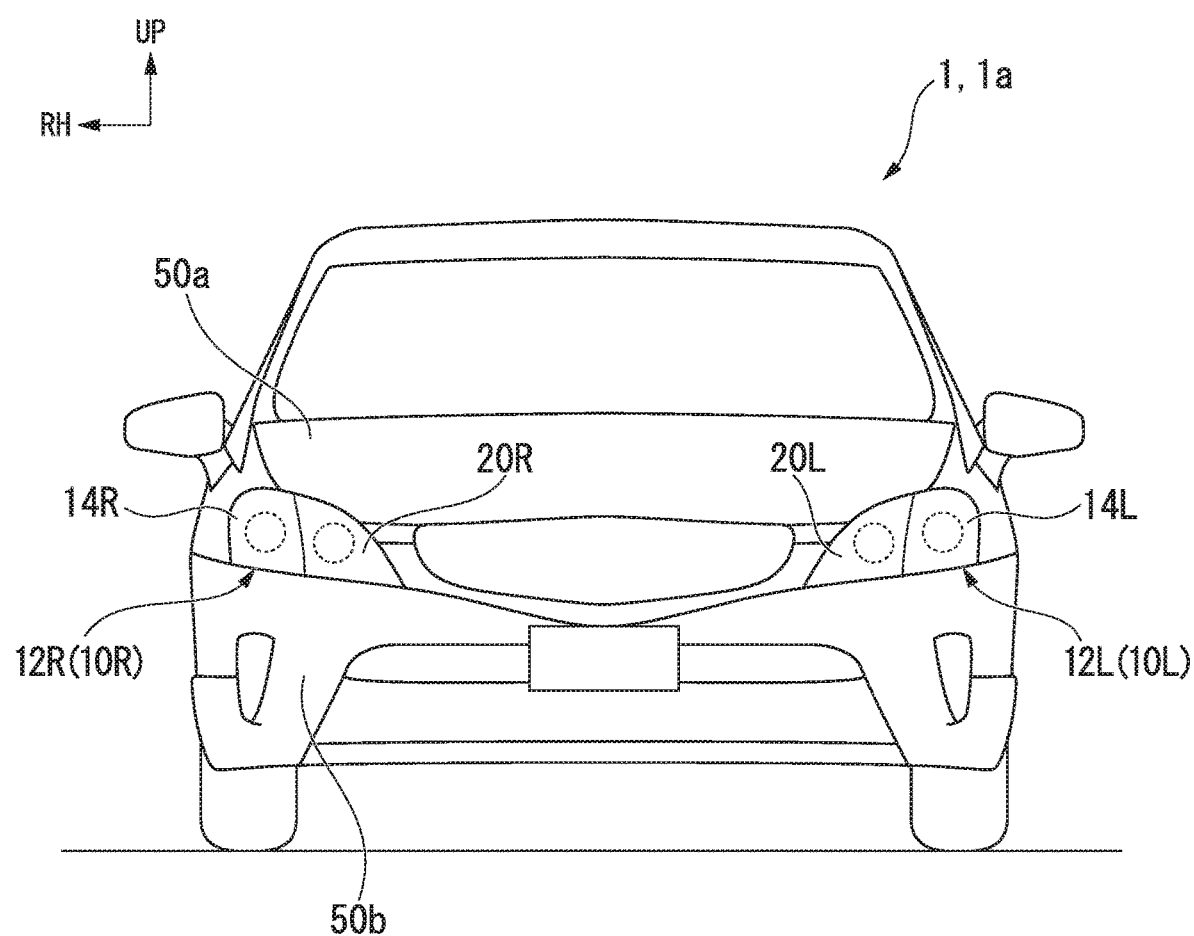
FIG. 2 is a view showing a front portion of the automobile to which a lighting device according to the first embodiment is applied.

FIG. 2 is a view showing a front portion of the automobile 1 to which a lighting device according, to the first embodiment is applied. As shown in FIG. 2, the left headlight section 10L includes a headlight unit 12L on a left side, and a left road surface drawing section 20L. The headlight unit 12L is disposed on a left end portion of a front end portion of the automobile 1, and the left road surface drawing section 20E is disposed on a right side of the headlight unit 12L. In addition, the right headlight section 10R includes a headlight unit 12R on a right side, and a right road surface drawing section 20R. The headlight unit 12R is disposed on a right end portion of a front end portion of the automobile 1, and the right road surface drawing section 20R is disposed on a left side of the headlight unit 12R.

In addition, a front end portion of a hood 50a configured to open and close an engine compartment of the automobile 1 is disposed over the headlight unit 12R and the headlight unit 12L. In addition, a portion below the left road surface drawing section 20L and the right road surface drawing section 20R is covered with a bumper cover 50b that constitutes a front end portion of the automobile 1 from a side in front thereof. Thus, the headlight unit 12R and the headlight unit 12L are laterally symmetrically configured in a vehicle width direction.

The headlight unit 12L includes a left headlight 14L that constitutes art outer portion of the headlight unit 12L in the vehicle width direction, and the left road surface drawing section 20R that constitutes an inner portion of the headlight unit 12L in the vehicle width direction.

The headlight unit 12R includes a right headlight 14R that constitutes an outer portion of the headlight unit 12R in the vehicle width direction, and the right road surface drawing section 20R that constitutes an inner portion of the headlight unit 12R in the vehicle width direction.

Hereinafter, in the left road surface drawing section 20L and the right road surface drawing section 20R, an arbitrary road surface drawing section is referred to as a road surface drawing section 20.

The left headlight 14L, and the right headlight 14R have light sources (not shown), and irradiate a side in front of the automobile 1 with light using the light sources. The light sources are constituted by light sources for a low beam and a high beam. That is, the left headlight 14L and the right headlight 14R are configured to be switchable to either one of a low beam that irradiates a road surface region (a low beam distribution area) in front of the automobile 1 as a main beam, and a high beam that irradiates a region thigh beam distribution area above the region irradiated with the low beam. Further, light emitting diodes (LEDs) halogen lamps, discharge lamps, lasers, or the like, are used as light sources of the left headlight 14L and the right headlight 14R.

[Schematic Functional Configuration of Lighting System of Automobile]

Figure 3:
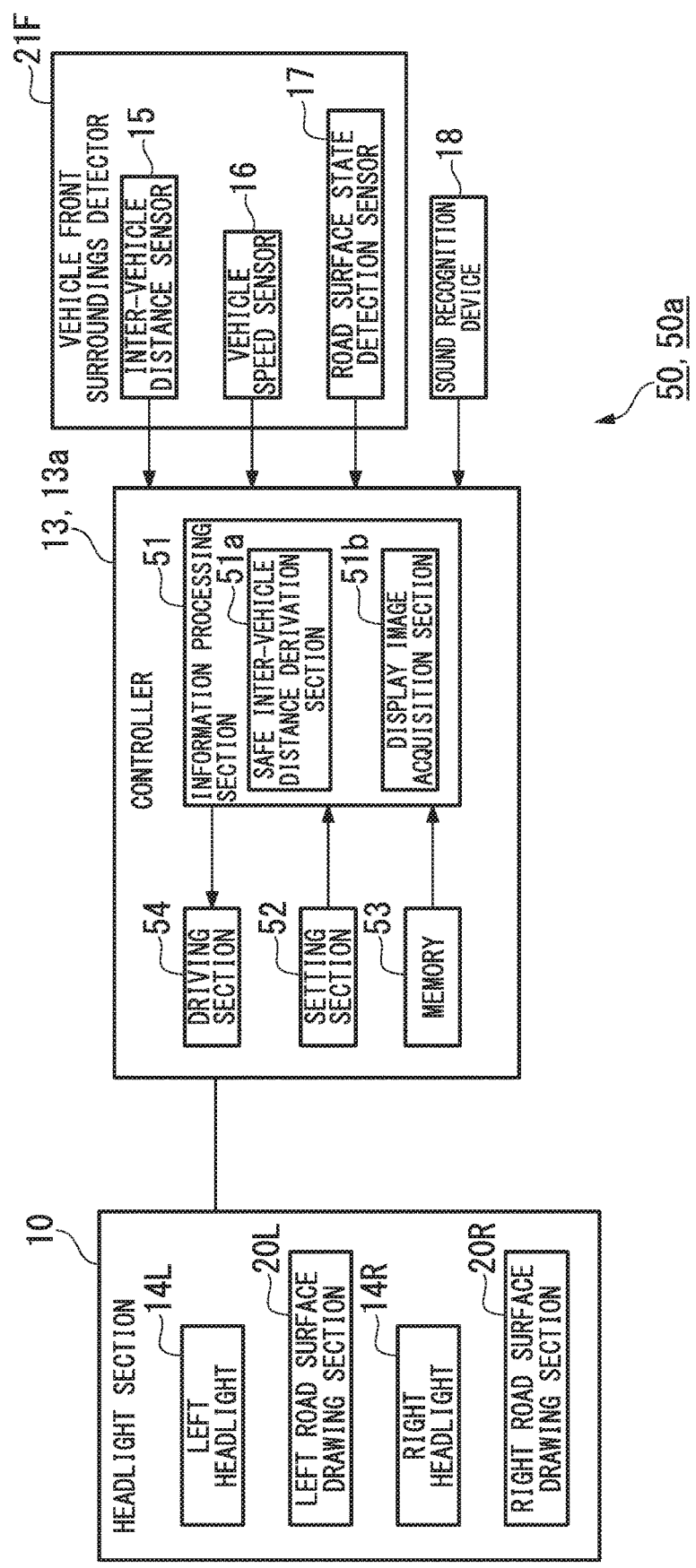
FIG. 3 is a functional block diagram showing a schematic functional configuration of a lighting system provided in the automobile according to the first embodiment.

FIG. 3 is, a functional block diagram showing a schematic functional configuration of a lighting system 50 provided in the automobile 1 according to the first embodiment.

The lighting system 50 includes a headlight section 10, the controller 13, the vehicle front surroundings detector 21F and a sound recognition device 18.

Here, in the embodiment, like the general concept of "forward and backward," a direction in which the automobile 1 advances conventionally in a direction in which a driver in the automobile 1 is conventionally directed is referred to as "to the front (forward)" and a direction opposite thereto is referred to as "to the rear (rearward)."

The headlight section 10 is a so-called headlamp, which radiates light to a side in front of the automobile 1.

The headlight section 10 includes the left road surface drawing section 20L, the right road surface drawing section 20R, the left headlight 14L and the right headlight 14R.

The left mad surface drawing section 20L mainly radiates light to a left side in front of the automobile 1. The left road surface drawing section 20L radiates a predetermined display image (in the embodiment, referred to as a left display image). The display image is an image drawn on a road surface. The display image is an image projected to a road surface. The display image is an image displayed on a road surface. The left road surface drawing section 20L, draws a left display image on a road surface by radiating the image. Here, the left display image itself may be changed as time elapses.

The right road surface drawing section 20R mainly radiates light to a right side in front of the automobile 1. The right road surface drawing section 20R radiates a predetermined display image (in the embodiment, referred to as a right display image). The right road surface drawing section 20R draws a right display image on a road surface by radiating the image. Here, the right display image itself may be changed as time elapses.

The left headlight 14L mainly radiates light to a left side in front of the automobile 1. The left headlight 14L has a function of radiating light of a traveling beam (a so-called high beam) and a function of radiating light of a passing beam (a so-called low beam), and the two functions can be switched between.

The right headlight 14R mainly radiates light to a right side in front of the automobile 1. The right headlight 14R has a function of radiating light of a traveling beam (a so-called high beam) and a function of radiating light of a passing beam (a so-called low beam), and the two functions can be switched.

Further, arbitrary lighting lamps may be used as the left headlight 14L, the right headlight 14R, the left road surface drawing section 20L and the right road surface drawing section 20R, respectively.

As a specific example, for example, one or more of a lamp of a traveling beam, a lamp of a passing beam, a micro electro mechanical systems (MEMS) laser scanning headlamp, a digital mirror device (DMD) headlamp, a matrix ADB headlamp configured to control in rows and columns, an ADB headlamp configured to control columns only, and so on, may be used as the lighting lamps.

Here, for example, an MEMS laser scanning headlamp is an example of a headlamp for a vehicle capable of variably changing a light distribution and an example of a seamless ADB lamp.

The vehicle front surroundings detector 21F may include a detector configured to detect arbitrary information related to surroundings in front of the vehicle, hi the embodiment, as examples of the vehicle front surroundings detector 21F, description will be continued using cases including an inter-vehicle distance sensor 15, a vehicle speed sensor 16 and a road surface state detection sensor 17 being provided.

The inter-vehicle distance sensor 15 detects another vehicle (hereinafter, referred to as "a preceding vehicle") located in a predetermined detection range in front of a host vehicle, and derives a distance between the detected preceding vehicle and the host vehicle (hereinafter, referred to as an "inter-vehicle distance"). The inter-vehicle distance sensor 15 outputs information showing the derived inter-vehicle distance to the controller 13. The inter-vehicle distance sensor 15 may include one or more of, for example, a light detection and ranging (LiDAR), radar, sonar, and so on.

The vehicle speed sensor 16 measures a speed of the automobile 1, and outputs information showing a vehicle speed of the automobile 1 to the controller 13.

The road surface state detection sensor 17 acquires air temperature information, humidity information or image information for outside of the automobile 1, and detects a state of a road surface on which the automobile 1 is traveling on the basis of the acquired air temperature information, humidity information or image information. Specifically, the road surface state detection sensor 17 may include an air temperature sensor, a humidity sensor, a camera (an imaging device), and so on. The camera or the like may include, for example, a function of detecting visible light, or may include a function of detecting infrared light, or may include both of these. In addition, a wiper device or the like may be connected to the road surface state detection sensor 17, and the road surface state detection sensor 17 may determine a state of a road surface on the basis of an operation situation of a wiper device. The road surface state detection sensor 17 determines whether the road surface is in one of a dry state, a half wet state, a wet state, a snow-packed state, a compacted snow state, a frozen state, a slush state, and so on. The road surface state detection sensor 17 outputs information showing a road surface state to the controller 13.

The sound recognition device 18 performs voice recognition processing by collecting a voice (a spoken voice) spoken by a driver in the automobile 1. For example, the sound recognition device 18 obtains a frequency spectrum by processing a waveform of the condensed voice through fast Fourier transform (FFT), extracts characteristics of the condensed voice, selects data having a highest likelihood (resemblance) by comparing the condensed voice with previously registered voice data, and outputs as operation instruction corresponding to the data to the controller 13. Here, the operation instruction includes an instruction for drawing a display image on a road surface, or an instruction for not drawing a display image on a road surface.

The controller 13 generates an image to be drawn on a road surface, and outputs a control signal for drawing the generated image on the road surface to the headlight section 10. The controller 13 has an information processing section 51, a setting section 52, a memory 53 and a driving section 54.

The setting section 52 acquires an operation instruction output from the sound recognition device 18, and determines whether a display image is to be drawn on a road surface according to the acquired operation instruction. The setting section 52 outputs a command for drawing, a display image on a road surface to the information processing section 51 when it is determined that a display image is to be drawn on the road surface, and outputs a command for not drawing a display image on a road surface to the information processing section 51 when it is determined that a display image is not to be drawn on the road surface.

The memory 53 is realized by, for example, a random access memory (RAM), a read only memory (ROM), a hard disk drive (HDD), a flash memory, or the like, or a hybrid type storage device or the like obtained by assembling a plurality of these memories. A program executed by the information processing section 51, control information for drawing, various display images, or the like, is stored in the memory 53.

The information processing section 51 is a functional section (hereinafter, referred to as "a software functional section") realized as a processor such as a central processing unit (CPU) executing programs stored in the memory 53.

Further, a part of or the entire information processing section 51 may be realized by hardware such as a large scale integration (LSI), an application specific integrated circuit (ASIC) or a field-programmable gate array (FPGA), or the like, or may be realized by an assembly of software functional sections and hardware.

The information processing section 51 generates a control signal on the basis of control information for drawing various display images stored in the memory 53, information showing an inter-vehicle distance output from the inter-vehicle distance sensor 15, information showing a vehicle speed of the automobile 1 output from the vehicle speed sensor 16, and information showing a road surface state output from the road surface state detection sensor 17, when a command for drawing the display image output from the setting section 52 on a road surface is acquired.

The information processing section 51 includes for example, a safe inter-vehicle distance derivation section 51a and a display image acquisition section 51b.

The safe inter-vehicle distance derivation section 51a derives a speed of a preceding vehicle on the basis of information showing an inter-vehicle distance and information showing a vehicle speed of the automobile 1. The safe inter-vehicle distance derivation section 51a derives a relative speed between the preceding vehicle and the host vehicle by subtracting the speed of the automobile 1 from the derived speed of the preceding vehicle.

The safe inter-vehicle, distance derivation section 51a obtains, a safe inter-vehicle distance using a derived result of a relative speed between the preceding vehicle and the host vehicle, and information showing a road surface state. Here, the safe inter-vehicle distance is a distance necessary to safely stop the automobile 1 after a driver notices an abnormality in front during traveling. The safe inter-vehicle distance derivation section 51a stores information obtained by associating the relative speed with the safe inter-vehicle distance.

Figure 4:
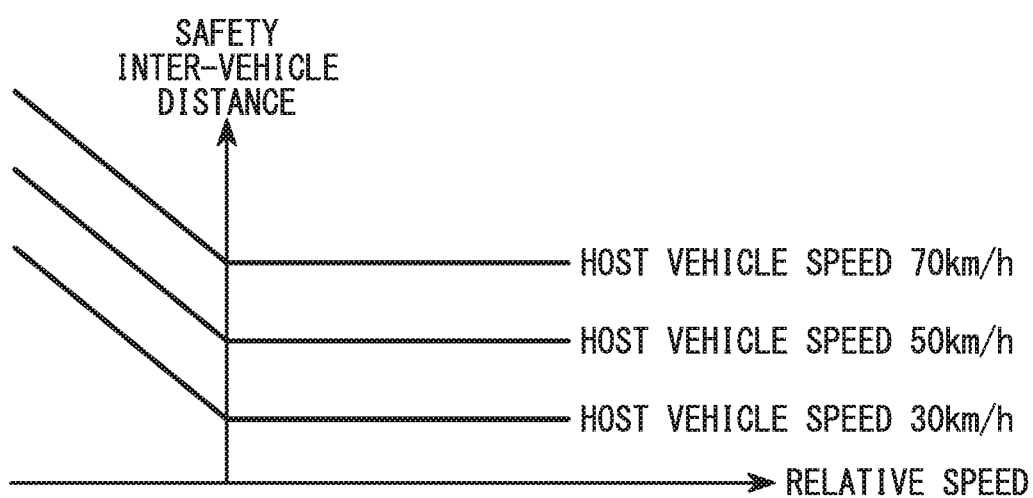
FIG. 4 is a view showing an example of information obtained by relating a relative speed and a safe inter-vehicle distance stored in a display device for a vehicle according to the first embodiment.

FIG. 4 is a view showing an example of information obtained by associating a relative speed and a safe inter-vehicle distance stored in a display device 100 for a vehicle according to the first embodiment.

In the example shown in FIG. 4, two-dimensional information obtained by associating a relative speed and a safe inter-vehicle distance is shown. In the example shown in FIG. 4, when a speed of the host vehicle is lower than that of the preceding vehicle, i.e., when a relative speed is positive, a safe inter-vehicle distance is constant. In addition, when a speed of the host vehicle is higher than that of the preceding vehicle, i.e., when a relative speed is negative, an absolute value of a relative speed is increased, and thus, a safe inter-vehicle distance is increased.

In the embodiment, the information obtained by associating the relative speed and the safe inter-vehicle distance is prepared at each road surface situation. Specifically, in three types of the case in which the road surface situation is a dry state, the case in which the road surface situation is a half wet state or a wet state and the case in which the road surface situation is a snow-packed state, a compacted snow state, a frozen state or a slush state, information obtained by associating the relative speed and the safe inter-vehicle distance is prepared. As it becomes the case in which the road surface situation is a dry state, the case in which the road surface situation is a half wet state or a wet state and the case in which the road surface situation is a snow-packed state, a compacted snow state, a frozen state or a slush state, the safe inter-vehicle distance is set to be longer. This is because, when a driver brakes the automobile 1, the automobile cannot easily stop as the road surface state gets worse.

Hereinafter, information obtained by associating a relative speed and a safe inter-vehicle distance shown in FIG. 4 corresponds to the case in which the road surface is a dry state, and description thereof will be continued.

FIG. 5A, FIG. 5B and FIG. 5C are views showing an example of derivation of a safe inter-vehicle distance.

FIG. 5A shows the case in which a mad surface is a dry state, a preceding vehicle has a speed of 70 km/h, and a host vehicle has a speed of 50 km/h, FIG. 5B shows the case in which a road surface is a dry state, a preceding vehicle has a speed of 50 km/h, and a host vehicle has a speed of 50 km/h. FIG. 5C shows the case in which a road surface is a dry state, a preceding vehicle has a speed of 30 km/h, and a host vehicle has a speed of 50 km/h.

In the case of FIG. 5A, a relative speed is a speed of 20 km/h. In this case, the safe inter-vehicle distance derivation section 51*a* obtains a safe inter-vehicle distance at which a relative speed becomes a speed of 20 km/h at a host vehicle speed of 50 km in the information obtained by associating the relative speed and the safe inter-vehicle distance shown in FIG. 4.

In the case of FIG. 5B, a relative speed is, a speed of 0 km/h. In this case, the safe inter-vehicle distance derivation section 51*a* obtains a safe inter-vehicle distance at which a relative speed becomes a speed of 0 km/h at a host vehicle speed of 50 km/h in the information obtained by associating the relative speed and the safe inter-vehicle distance shown FIG. 4.

In the case of FIG. 5C, a relative speed is a speed of −20 km/h. In this case, the safe inter-vehicle distance derivation section 51*a* obtains a safe inter-vehicle distance at which a relative speed becomes a speed of −20 km/h at a host vehicle speed of 50 km/h in the information obtained by associating the relative speed and the safe inter-vehicle distance shown in FIG. 4.

When the speed of the host vehicle is lower than the derived speed of the preceding vehicle, i.e., when a relative speed is positive, as described above, since the safe inter-vehicle distance becomes the same value, as shown in FIG. 5A and FIG. 5B, a display image G is drawn at a position separated a safe inter-vehicle distance from the host vehicle.

When the speed of the host vehicle is higher than the derived speed of the preceding vehicle, i.e., when a relative speed is negative, since the safe inter-vehicle distance becomes longer than when the relative speed is positive, as shown in FIG. 5C, a display image G is drawn at a position farther from the host vehicle than in FIG. 5A or FIG. 5B. Hereinafter, a distance between the host vehicle and a drawing position of a display image is referred to as a drawing distance D. As an example, while the drawing distance D is shown in FIG. 5A, FIG. 5B and FIG. 5C, a reference position at which a distance between the host vehicle and the drawing position of the display image is determined can be arbitrarily set.

The safe inter-vehicle distance derivation section 51*a* outputs information showing the obtained safe inter-vehicle distance and information showing an inter-vehicle distance to the display image acquisition section 51*b*.

The display image acquisition section 51*b* acquires information showing a safe inter-vehicle distance output from the safe inter-vehicle distance derivation section 51*a* and information showing an inter-vehicle distance, and determines whether the inter-vehicle distance is larger than the safe inter-vehicle distance on the basis of the information showing the acquired safe inter-vehicle distance and the information showing the inter-vehicle distance. The display image acquisition section 51*b* acquires information showing a display image representing that the inter-vehicle distance is the safe inter-vehicle distance among control information for drawing various display images stored in the memory 53 when it is determined that the inter-vehicle distance is larger than the safe inter-vehicle distance. The display image acquisition section 51*b* outputs information showing the display image representing that the inter-vehicle distance is the acquired safe inter-vehicle distance and the information showing the drawing distance (here, the safe inter-vehicle distance) to the driving section 54.

The display image acquisition section 51*b* determines whether the inter-vehicle distance is larger than a lamp lights-out distance when it is determined that the inter-vehicle distance is the safe inter-vehicle distance or smaller. Here, the lamp lights-out distance is a distance at which collision with the preceding vehicle is inevitable, lamp lights-out distance is a distance smaller than the safe inter-vehicle distance. The display image acquisition section 51*b* acquires information showing a display image representing a warning display informing a driver of that a distance from the preceding vehicle is smaller than the safe inter-vehicle distance, among the control information for drawing various display images stored in the memory 53, when it is determined that the inter-vehicle distance is larger than the lamp lights-out distance after it is determined that the inter-vehicle distance is the safe inter-vehicle distance or smaller. The display image acquisition section 51*b* outputs information showing a display image representing that the image is the acquired warning display and information showing the drawing distance (here, the safe inter-vehicle distance) to the driving section 54.

The display image acquisition section 51*b* creates a command of turning off a light source 21 and outputs the created command of turning off the light source 21 to the driving section 54 without acquiring the information showing the display image stored in the memory 53 when it is determined that the inter-vehicle distance is the lamp lights-out distance or smaller.

The driving section 54 drives some or all of the light source 21, an image generating section 31 and a reflecting apparatus 44 on the basis of the information showing the display image representing the safe inter-vehicle distance output from the display image acquisition section 51*b*, the information showing the drawing distance or the command of turning off the light. Processing of driving some or all of the light source 21, the image generating section 31 and the reflecting apparatus 44 will be described in detail.

[Functional Configuration of Display Device for a Vehicle]

Figure 6:
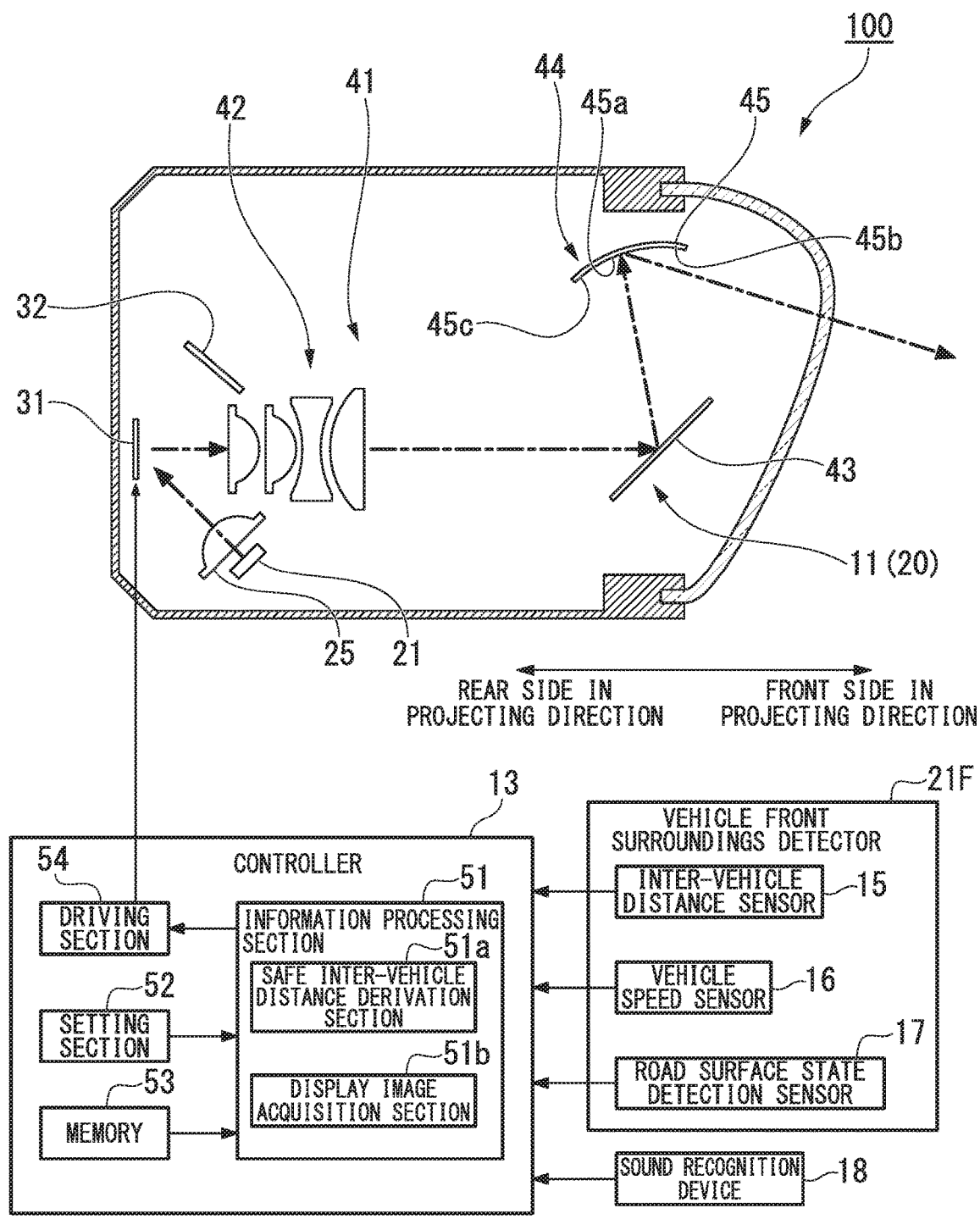
FIG. 6 is a schematic view of a display device for a vehicle according to the first embodiment.

FIG. 6 is a schematic view of the display device 100 for a vehicle according to the first embodiment.

As described above, the display device 100 for a vehicle of the first embodiment includes the road surface drawing section 20 configured to radiate light having an image from the vehicle toward a road surface in an inclined manner.

As shown in FIG. 6, the display device 100 for a vehicle includes a projecting module 11 (the road surface drawing section 20) configured to radiate an image to a side in front of the automobile 1, the controller 13, the vehicle front surroundings detector 21F and the sound recognition device 18. The controller 13, the vehicle front surroundings detector 21F and the sound recognition device 18 are the same as above, and thus, description thereof will be omitted. Here, the projecting module 11 (the road surface drawing section 20) will be described in detail.

Figure 7:
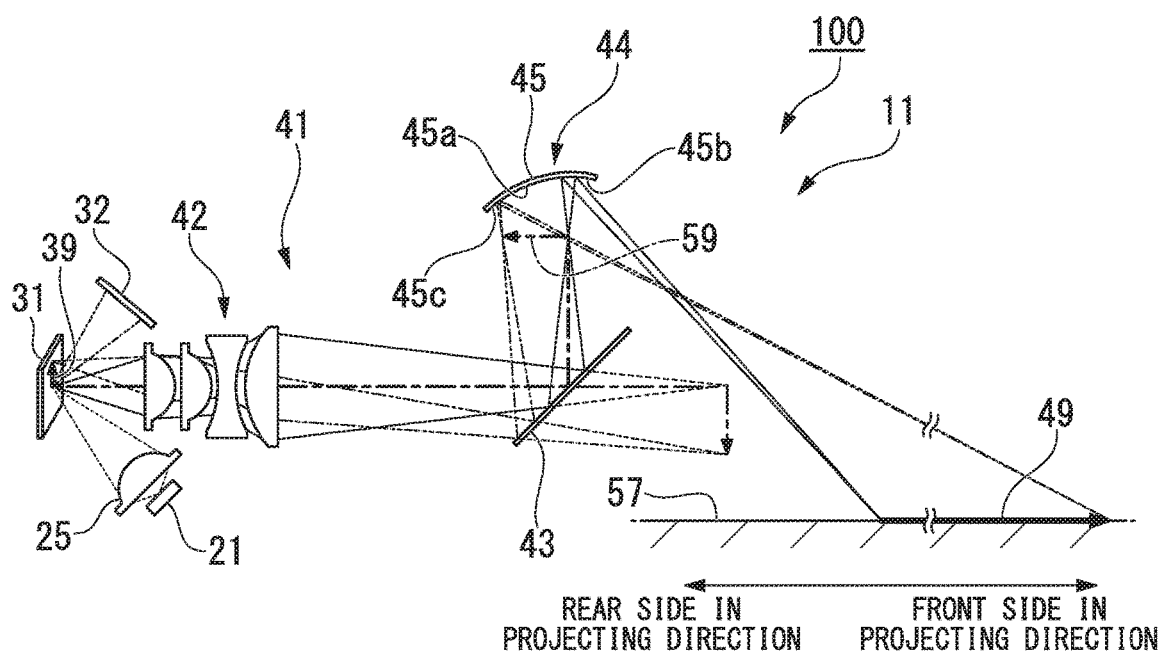
FIG. 7 is a schematic view showing a projecting module of the first embodiment.

FIG. 7 is a schematic view showing the projecting module 11 of the first embodiment.

The projecting module 11 of the first embodiment includes the light source 21, an incident optical system 25, the image generating section 31 and a projection optical system 41.

The light source 21 emits visible light. A light emitting diode (LED) light source or a laser light source may be employed as the light source 21.

The incident optical system 25 is constituted by one or a plurality of lenses or the like that condense light from the light source 21 and radiate the condensed light to a reflective control surface of the image generating section 31.

The image generating section 31 is a section configured to modulate light emitted from the light source 21 to generate an image, and in the first embodiment, is constituted by a reflective digital light deflection device (a digital mirror device (DMD). The image generating section 31 constituted by the reflective digital light deflection device has a reflective control surface configured by arranging a plurality of mirror elements that are tillable.

The plurality of mirror elements of the image generating section 31 control tilting angles toward a reflecting side or a shielding side according to signals from the controller 13. The image generating section 31 generates a reflection pattern (an image) 39 having an arbitrary shape using reflected light of the plurality of mirror elements tilted toward the reflecting side. In the example shown in FIG. 7, the display device 100 for a vehicle generates the reflection pattern 39 having an arrow shape.

Further, a light shielding member 32 configured to shield light from the mirror elements tiled toward the shielding side is installed on the display device 100 for a vehicle.

The projection optical system 41 radiates the reflection pattern 39 generated in the image generating section 31 to a side in front of the vehicle as a light distribution pattern 49. The projection optical system 41 includes a condensing optical system 42, a reflecting mirror 43 and the reflecting apparatus 44.

The condensing optical system 42 is constituted of one or a plurality of lenses or the like. The condensing optical system 42 radiates the reflection pattern 39 generated in the image generating section 31 to a reflecting section 45 of the reflecting apparatus 44 via the reflecting mirror 43. In addition, the condensing optical system 42 condenses the reflection pattern 39 emitted from the image generating section 31 and captures an intermediate image 59.

The reflecting mirror 43 is a mirror configured to reflect light from the condensing optical system 42 toward the reflecting section 45.

The reflecting apparatus 44 has the reflecting section 45. The reflecting section 45 reflects the light condensed by the condensing optical system 42 toward a road surface 57 by reflecting the light from the reflecting mirror 43.

The reflecting section 45 is a concave surface reflector for enlargement projection. The reflecting section 45 has a reflecting surface 45a. The reflecting section 45 reflects light condensed by the condensing optical system 42 in the reflecting surface 45a and projects the light to a predetermined region of the road surface 57. The reflecting surface 45a has a concave surface shape constituted by a free curved surface of a non-spherical surface.

The reflecting surface 45a is disposed at a following stage of the intermediate image 59 formed by the condensing optical system 42. Accordingly, the light is imaged on a preceding stage of the reflecting surface 45a, enters the reflecting surface 45a having a concave surface shape while spreading in a diffusion direction, and is condensed again by being reflected by the reflecting surface 45a.

Further, in the specification "preceding stage" and "following stage" mean a positional relation along a transmitting pathway of light (i.e., an upstream side and a downstream side in an optical path), and do not mean disposition of areas in the display device 100 for a vehicle.

A region 45b at front side of the reflecting surface 45a in a projecting direction reflects light toward the road surface 57 in the vicinity of the vehicle. In addition, a region 45c at rear side of the reflecting surface 45a in the projecting direction reflects light toward the road surface 57 far side from the vehicle. The reflecting surface 45a is formed to continuously vary a curvature according to a distance from a projection target (a side far from the vehicle from the road surface 57 in the vicinity of the vehicle) from the region 45c at rear side in the projecting direction toward the region 45b at front side in the projecting direction. That is, the reflecting surface 45a has a curvature that gradually increases from a rear side in the projecting direction toward a front side in the projecting direction. Accordingly, in comparison with the region 45c at rear side in the projecting direction from which a light is reflected toward a side far from the vehicle, in the region 45b at from side in the projecting direction from which a light is reflected toward the vicinity of the vehicle, a distance between a region from which light is reflected in the reflecting surface 45a and a region in which the light distribution pattern 49 is imaged in the road surface 57, which is an imaging surface of the road surface 57, can be shortened, and therefore, out of focus of the imaged light distribution pattern 49 can be suppressed.

Figure 8A:
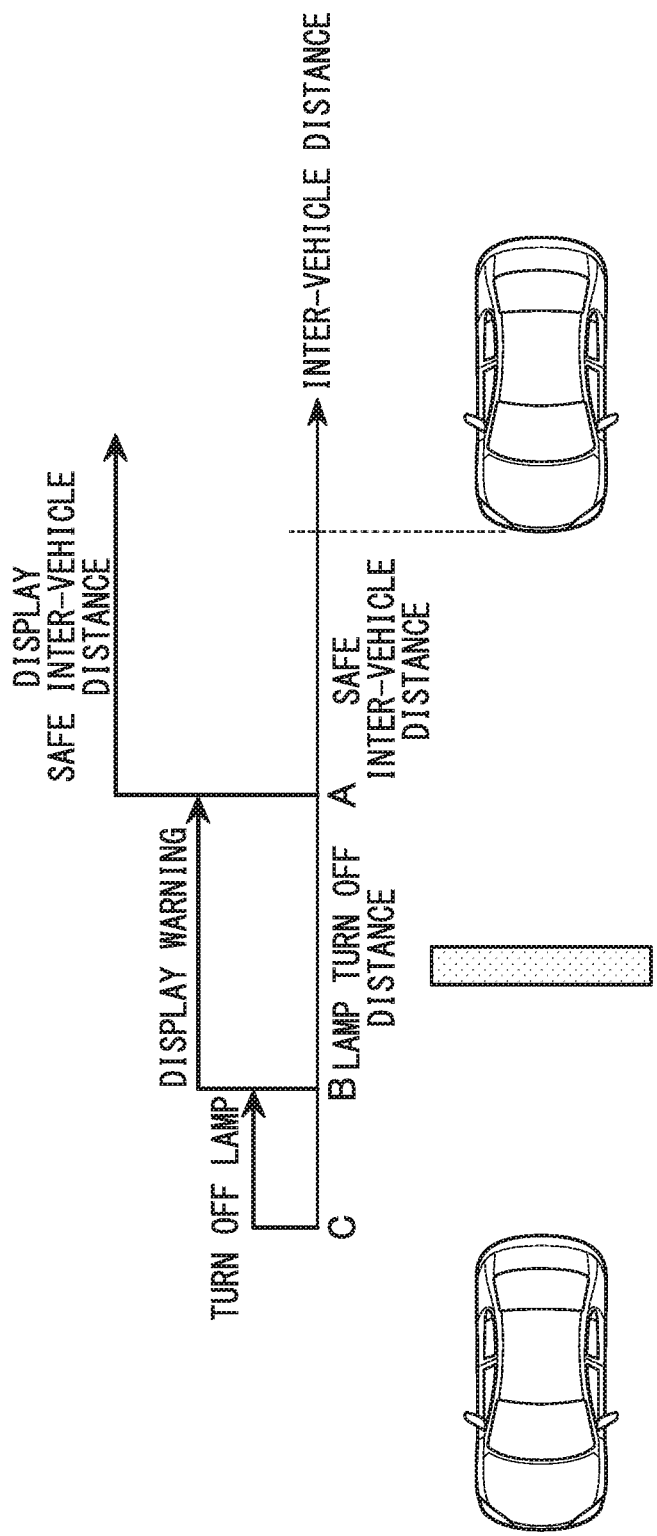
FIG. 8A is a view showing an example of road surface drawing of the display device for a vehicle according to the first embodiment.
Figure 8B:
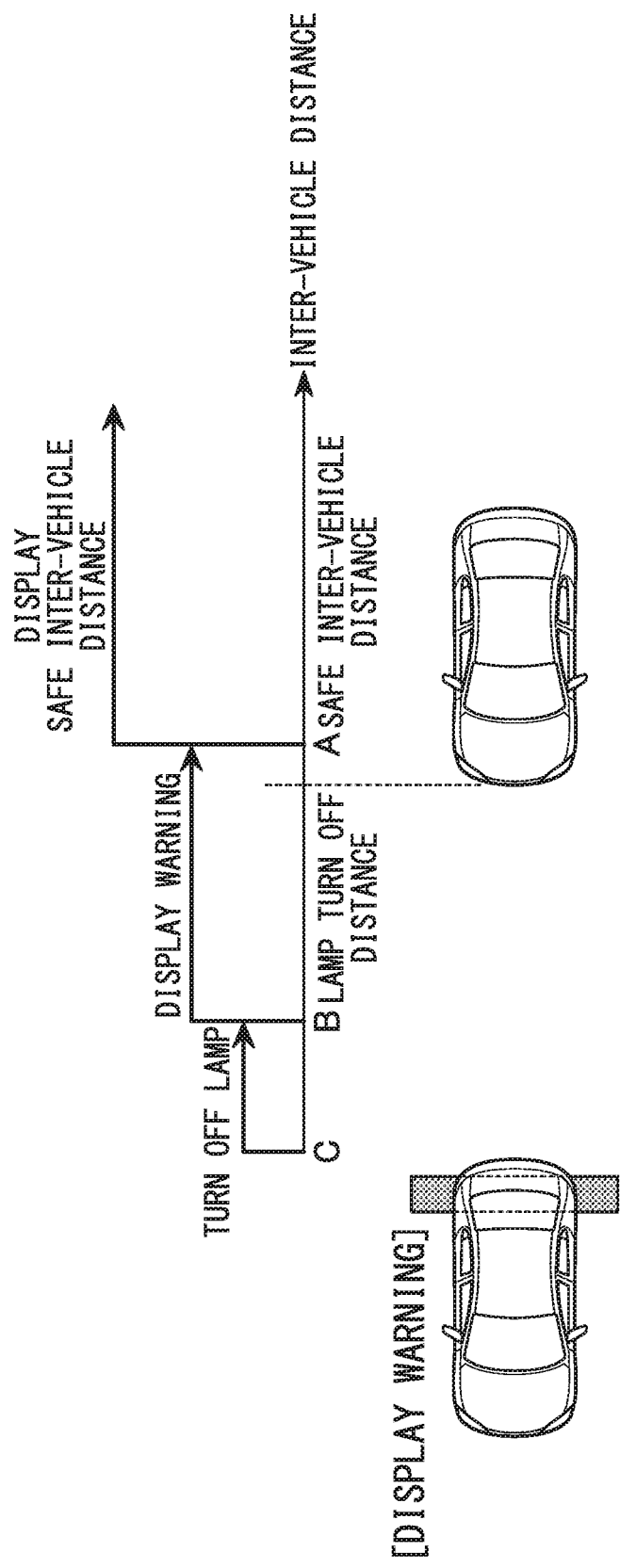
FIG. 8B is a view showing an example of road surface drawing of the display device for a vehicle according to the first embodiment.
Figure 8C:
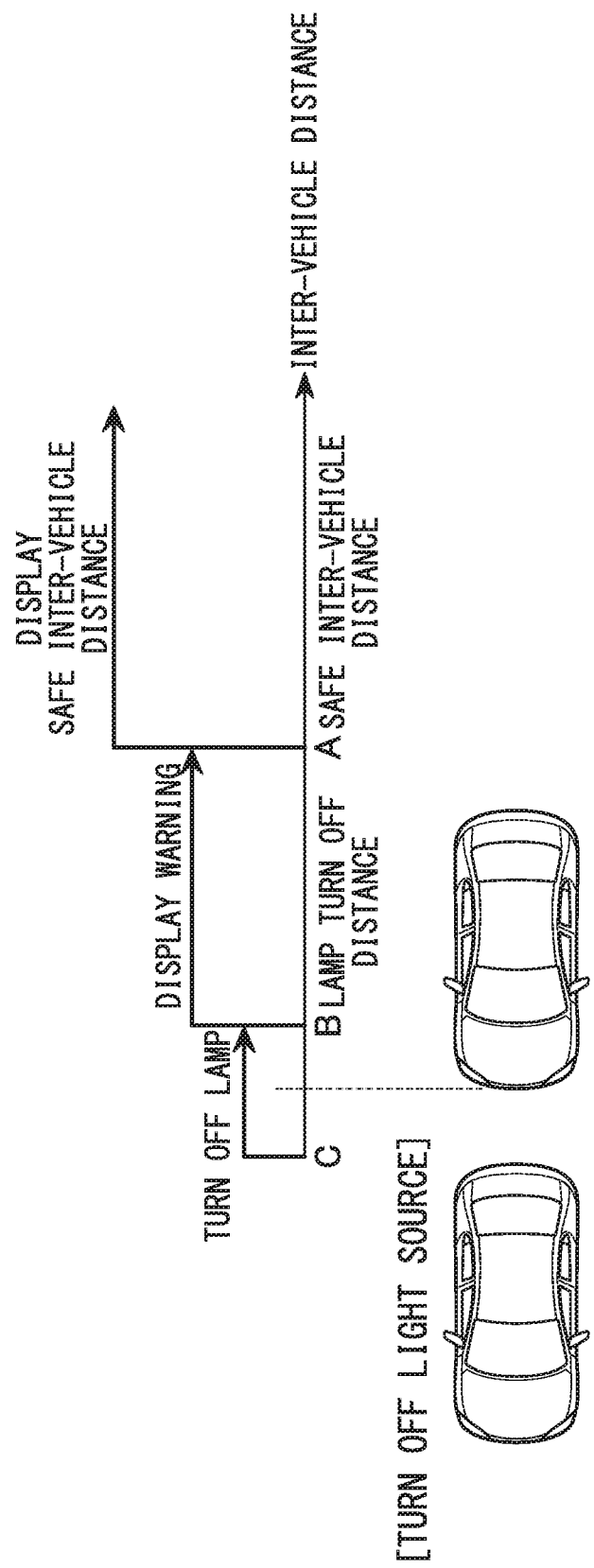
FIG. 8C is a view showing an example of road surface drawing of the display device for a vehicle according to the first embodiment.

FIG. 8A, FIG. 8B and FIG. 8C are views, showing an example of road surface drawing of the display device for a vehicle according to the first embodiment.

The driving section 54 performs the following processing when information showing a display image output from the display image acquisition section 51b is information showing a display image representing the safe inter-vehicle distance and information showing a drawing distance shows a safe inter-vehicle distance.

The driving section 54 performs on the light source 21, and outputs a display image representing the safe inter-vehicle distance to the image generating section 31. The driving section 54 controls the regions such that any one of the region 45b at front side of the reflecting surface 45a in the projecting direction and the region 45c at rear side in the projecting direction becomes a region in which light from the condensing optical system 42 is reflected to a road surface separated a safe inter-vehicle distance from a side in front of the automobile 1. A region in which light from the condensing optical system 42 is reflected to a road surface separated a safe inter-vehicle distance from a side in front of the automobile 1 is previously adjusted. The safe inter-vehicle distance is a distance smaller than an inter-vehicle distance between a preceding vehicle 2 and the host vehicle. Accordingly, since light from the condensing optical system 42 is reflected by the region, as shown in FIG. 8A, a display image is drawn on a road surface separated a safe inter-vehicle distance from a side in front of the automobile 1. In the example shown in FIG. 8A, the display image representing the safe inter-vehicle distance is displayed by a hatched bold line extending in a direction perpendicular to a direction of advance of the vehicle. A driver can hold the safe inter-vehicle distance by being aware that the display image is not radiated to a rear section of the preceding vehicle.

The driving section 54 performs the following processing when information showing a display image output from the display image acquisition section 51*b* is a display image representing a warning display and information showing a drawing distance shows a distance larger than a lamp lights-out distance and a safe inter-vehicle distance or less.

The driving section 54 turns on the light source 21 and outputs information showing a display image representing a warning display to the image generating section 31. The driving section 54 controls the regions such that any one of the region 45*b* at front side of the reflecting surface 45*a* in the projecting direction and the region 45*c* at rear side in the projecting direction becomes a region from which light emitted from the condensing optical system 42 is reflected to a road surface separated a safe inter-vehicle distance from a side in front of the automobile 1. The region in which the light from the condensing optical system 42 is reflected to a road surface separated a safe inter-vehicle distance from a side in front of the automobile 1 is previously adjusted. Accordingly, since the light from the condensing optical system 42 is reflected by the region, as shown in FIG. 8B, a display image is drawn on a road surface separated a safe inter-vehicle distance from a side in front of the automobile 1. In the example shown in FIG. 8B, a display image representing a warning display is represented as a hatched bold line extending in a direction perpendicular to a direction of advance of the vehicle. As a result, in the display image representing the warning display, a central portion of the display image may be displayed on a rear body of the preceding vehicle, and both end portions of the display image may be displayed on a road surface on a side surface side of the preceding vehicle.

As the image is displayed in this way, it is possible to promote the driver to recognize that the inter-vehicle distance is the safe inter-vehicle distance or less and adjust a speed of the host vehicle to keep safety such that a distance from the preceding vehicle is separated.

The driving section 54 performs the following processing when the display image acquisition section 51*b* outputs a command of turning off the light.

The driving section 54 turns off the light source 21. Specifically, the driving section 54 derives a time to collision from an inter-vehicle distance to the preceding vehicle and a relative speed, and turns off the light source 21 at timing when the derived time to collision is one second or less. Accordingly, as shown in FIG. 8C, a display image representing a warning display is not drawn.

[Example of Display Image]

FIG. 9A, FIG. 9B, FIG. 9C, FIG. 9D and FIG. 9E are views showing an example of a display image displayed on a road surface by the display device 100 for a vehicle according to the first embodiment.

As shown in FIG. 8A and FIG. 8B, FIG. 9A shows a display image representing a safe inter-vehicle, distance or a display image representing a warning display with hatching. In this case, whether the image is a display image representing a safe inter-vehicle distance or a display image representing a warning display is represented as a contrast is varied. In addition, in the case of the warning display, the display may be varied by changing a color or may be varied by flickering.

FIG. 9B is a view showing a display image representing a safe inter-vehicle distance or a display image representing a warning display using a difference in contrast.

FIG. 9C is a view showing a display image representing a sale inter-vehicle distance using characters or the like. In the example shown in FIG. 9C, a display image representing a safe inter-vehicle distance is shown by a character array of "Safety." Here, a display image representing a warning display may be shown by a character array of "Caution."

FIG. 9D is a view showing a display image representing a safe inter-vehicle distance or a display image representing a warning display using a diagram, a symbol, or the like. In the example shown in FIG. 9D, as an example of the diagram or the symbol, a display image representing a safe inter-vehicle distance is shown by arrows.

Further, a display image displayed on a road surface by the display device 100 for a vehicle described in FIG. 9A, FIG. 9B, FIG. 9C and FIG. 9D may be displayed while flickering.

FIG. 9E is a view showing that a display image representing a safe inter-vehicle distance or a display image representing a warning display is moved in a direction of advance of the vehicle. In the example shown in FIG. 9E, the hatched bold line is shown to move in the direction of advance of the vehicle. In this case, whether the image is a display image representing a safe inter-vehicle distance or a display image representing a warning display is represented by a contrast of a bold line.

[Example of Procedure of Road Surface Drawing Processing]

Figure 10:
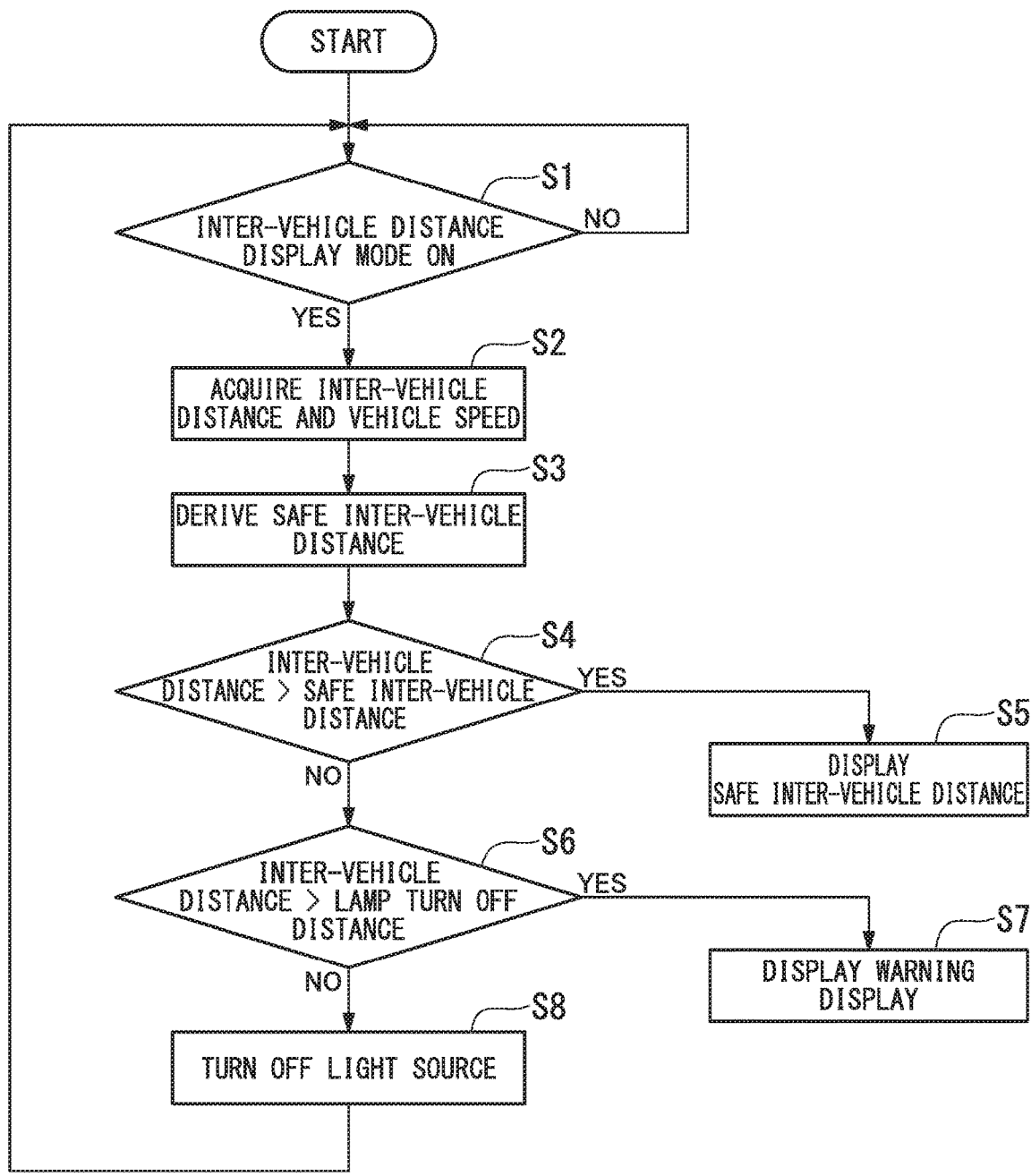
FIG. 10 is a flowchart showing art example of a procedure of road surface drawing processing of the display device for a vehicle provided in the automobile according to the first embodiment.

FIG. 10 is a flowchart showing an example of a procedure of road surface drawing processing of the display device 100 for a vehicle provided in the automobile 1 according to the first embodiment.

In the example, it is assumed that a certain person sits on a driver's seat in the automobile 1 as a driver.

(Step S1)

The setting section 52 acquires an operation instruction output from the sound recognition device 18, and sets a mode of drawing a display image according to an inter-vehicle distance between the host vehicle and the preceding vehicle on a road surface (an inter-vehicle distance display mode) or a mode of not drawing a display image on a road surface (an inter-vehicle distance non-display mode) according to the acquired operation instruction. When the setting, section 52 is set to the inter-vehicle distance non-display mode, the procedure returns to step S1.

(Step S2)

When the setting section 52 is set to the inter-vehicle distance display mode, the safe inter-vehicle distance derivation section 51*a* acquires information showing an inter-vehicle distance output from the inter-vehicle distance sensor 15, information showing a vehicle speed of the automobile 1 output from the vehicle speed sensor 16, and information showing a road surface state output from the road surface state detection sensor 17.

(Step S3)

The safe inter-vehicle distance derivation section 51*a* derives a relative speed between the preceding vehicle, and the automobile 1 on the basis of the information showing the inter-vehicle distance and the information showing the vehicle speed of the automobile 1, which are acquired in step S2. The safe inter-vehicle distance derivation section 51*a* derives a safe inter-vehicle distance from information obtained by associating the relative speed and the safe inter-vehicle distance on the basis of information showing the derived relative speed and the road surface state.

(Step S4)

The display image acquisition section 51*b* determines whether the inter-vehicle distance is larger than the safe inter-vehicle distance.

(Step S5)

The display image acquisition section 51b acquires information showing a display image representing a safe inter-vehicle distance from the memory 53 when it is determined that the inter-vehicle distance is larger than the safe inter-vehicle distance, and outputs the information showing the display image representing the acquired safe inter-vehicle distance and information showing a drawing distance (here, a safe inter-vehicle distance) to the driving section 54.

The driving section 54 draws a display image representing a safe inter-vehicle distance on a road surface separated a drawing distance from a side in front of the automobile 1 by driving the light source 21, the image generating section 31 and the reflecting apparatus 44 on the basis of the information showing the display image and the information showing the drawing distance.

(Step S6)

In step S4, when the display image acquisition section 51b determines that the inter-vehicle distance is the safe inter-vehicle distance or smaller, the display image acquisition section 51b determines whether the inter-vehicle distance is larger than the lamp lights-out distance.

(Step S7)

The display image acquisition section 51b acquires information showing a display image representing a warning display from the memory 53 when it is determined that the inter-vehicle distance is larger than the lamp lights-outdistance, and outputs the information showing the display image representing the acquired warning display and the information showing the drawing distance (here, the safe inter-vehicle distance) to the driving section 54.

The driving section 54 draws a display image representing a warning display on a road surface separated a sale inter-vehicle distance from a side in front of the automobile 1 by driving the light source 21, the image generating section 31 and the reflecting apparatus 44 on the basis of the information showing the drawing distance and the information showing the display image.

(Step S8)

In step S6, when the display image acquisition section 51b determines that the inter-vehicle distance is the lamp lights-out distance or smaller, the display image acquisition section 51b creates a command of turning off the light source 21, and outputs the created command of turning off the light source 21 to the driving section 54.

The driving section 54 turns off the light source 21 on the basis of the command of turning off the light source output from the display image acquisition section 51b.

After processing in step S8 is terminated, the procedure is shifted to step S1.

In a flowchart shown in FIG. 10, processing of steps S4 to S8 may be interchanged. Specifically, before comparing the inter-vehicle distance with the safe inter-vehicle distance, the inter-vehicle distance and the lamp lights-out distance may be compared.

In the above-mentioned first embodiment, while the case in which both of the left road surface drawing section 20L and the right road surface drawing section 20R draw the display image representing the safe inter-vehicle distance or the display image representing the warning display on the road surface has been described, there is no limitation thereto. For example, the left road surface drawing section 20L or the right road surface drawing section 20R may draw a display image representing a safe inter-vehicle distance or a display image representing a warning display on a road surface, or any one or both of the left headlight 14L and the right headlight 14R may draw a display image representing a safe inter-vehicle distance or a display image representing a warning display on a road surface.

In the above-mentioned first embodiment, while the case in which an operation of drawing a display image on a road surface or an operation of not drawing a display image on a road surface is performed by the road surface drawing section 20 on the basis of the operation instruction obtained from a result of voice recognition by the sound recognition device 18 has been described, there is no limitation thereto. For example, as a driver performs a certain operation, the controller 13 may perform an operation, of drawing a display image on a road surface or an operation of not drawing a display image on a road surface using the left road surface drawing section 20L or the right road surface drawing section 20R.

In addition, when some conditions are satisfied, the controller 13 may automatically perform an operation of drawing a display image on a road surface using the left road surface drawing section 20L or the right road surface drawing section 20R. When some conditions are not satisfied, the controller 13 may automatically perform an operation of not drawing a display image on a road surface using the left road surface drawing section 20L or the right road surface drawing section 20R.

In the above-mentioned first embodiment, while the case in which the information processing section 51 causes the road surface drawing section 20 to draw a display image on a road surface on the basis of the control information for drawing various display images stored in the memory 53, the information showing the inter-vehicle distance output from the inter-vehicle distance sensor 15, the information showing the vehicle speed of the automobile 1 output from the vehicle speed sensor 16 and the information showing the road surface state output from the road surface state detection sensor 17 has been described, there is no limitation thereto. For example, when the information processing section 51 causes the road surface drawing section 20 to draw a display image on a road surface without using the information showing the road surface state, the information processing section 51 may cause the road surface drawing section 20 to draw a display image on a road surface on the basis of the control information, for drawing various display image stored in the memory 53, the information showing the inter-vehicle distance output from the inter-vehicle distance sensor 15 and the information showing the vehicle speed of the automobile 1 output from the vehicle speed sensor 16. According to the above-mentioned configuration, a processing, load of the information processing section 51 can be reduced.

In the above-mentioned first embodiment, the case in which the information obtained by associating the relative speed and the safe inter-vehicle distance corresponds to the case in which a road surface is a dry state has been described, there is no limitation thereto. For example, the embodiment may be applied to the case in which a road surface situation is a half wet state or a wet state or the case in which a road surface situation is a snow-packed state, a compacted snow state, a frozen state, or a slush state.

In the above-mentioned first embodiment, while the case in which the command of turning off the light source 21 is created and the created command of turning off the light source 21 is output to the driving section 54 when the inter-vehicle distance is the lamp lights-out distance or smaller has been described, there is no limitation thereto. For example, when the inter-vehicle distance is the lamp lights-out distance or smaller and the road surface drawing section 20 is constituted by the laser light source, a command of turning off the light source 21 may be created and the created command of turning off the light source 21 may be output to the driving section 54. According to the above-mentioned configuration, exposure of laser light due to collision and damage of the road surface drawing section 20 of the display device 100 for a vehicle can be prevented. In addition, the display image acquisition section 51*b* of the controller 13 may have a function of predicting whether the host vehicle will collide with the preceding vehicle, and when a collision is predicted, may crease a command of turning off the light source 21 and output the created command of turning off the light source 21 to the driving section 54.

In the above-mentioned first embodiment, while the case in which the display image representing the safe inter-vehicle distance or the display image representing the warning display is represented at a position of a bold line extending in a direction perpendicular to a direction of advance of the vehicle, and is represented so that characters, a position, a pattern, or the like, is changed through a difference in contrast, characters or the like, a diagram, a symbol or the like, or the bold line extending in the perpendicular direction is moved with respect to a direction of advance of the vehicle has been described, there is no limitation thereto. For example, the display image may be represented by changing a color or the like.

In the above-mentioned first embodiment, the display image representing the safe inter-vehicle distance or the display image representing the warning display may be displayed away from the host vehicle as it becomes the fair weather, the rainy weather and the snowy sky. For example, even when a road environment gets worse to an urban district, a mountain path, a gravel road, or the like, the display image is displayed away from the host vehicle.

In the above-mentioned first embodiment, the reflecting mirror 43 may be omitted.

Figure 11:
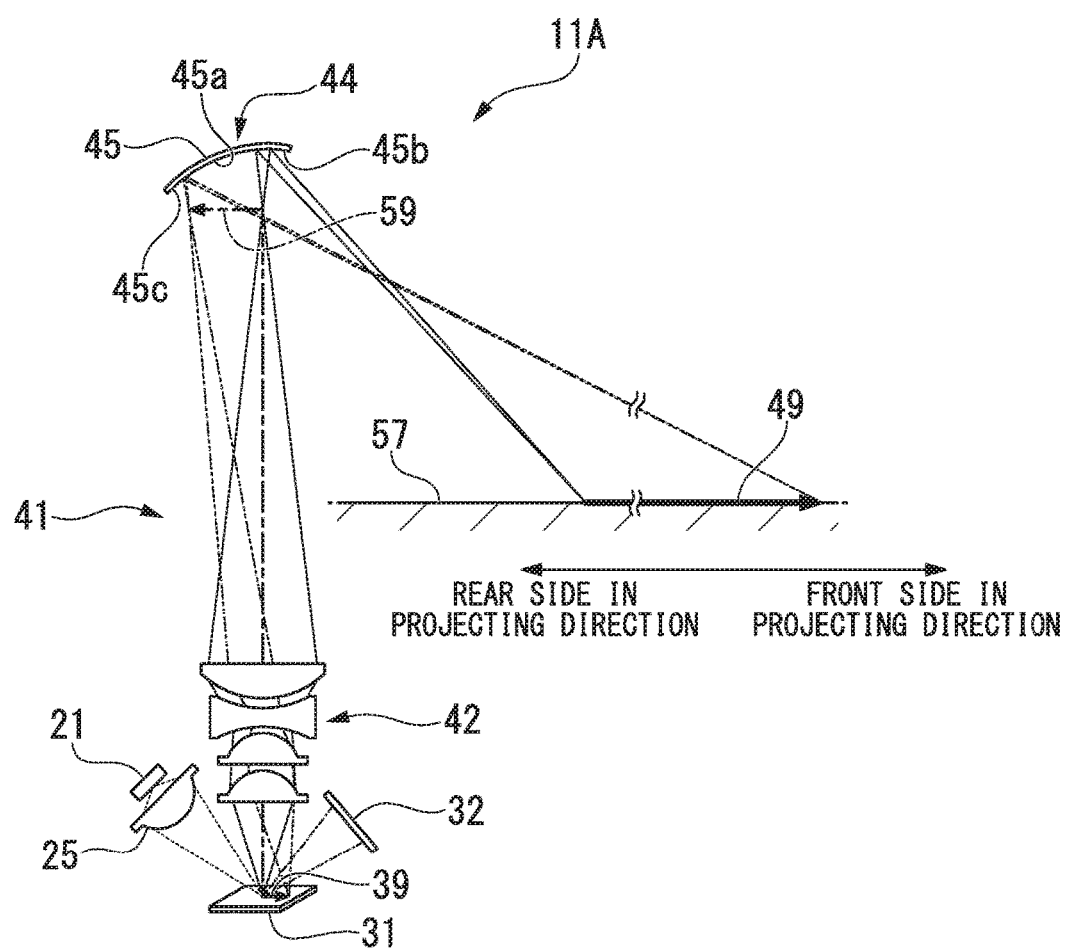
FIG. 11 is a view showing a projecting module of a variant that can be employed in the first embodiment.

FIG. 11 is a view showing a projecting module 11A of a variant that can be employed in the first embodiment. The projecting module 11A is distinguished from that of the above-mentioned first embodiment in that the reflecting mirror 43 is not provided. According to the variant, it is possible to provide an inexpensive display device 100 for a vehicle by reducing the number of parts.

In the above-mentioned first embodiment, while the case in which the image generating section 31 is reflective type has been described, there is no limitation thereto. For example, the image generating section 31 may be a transmissive type.

Figure 12:
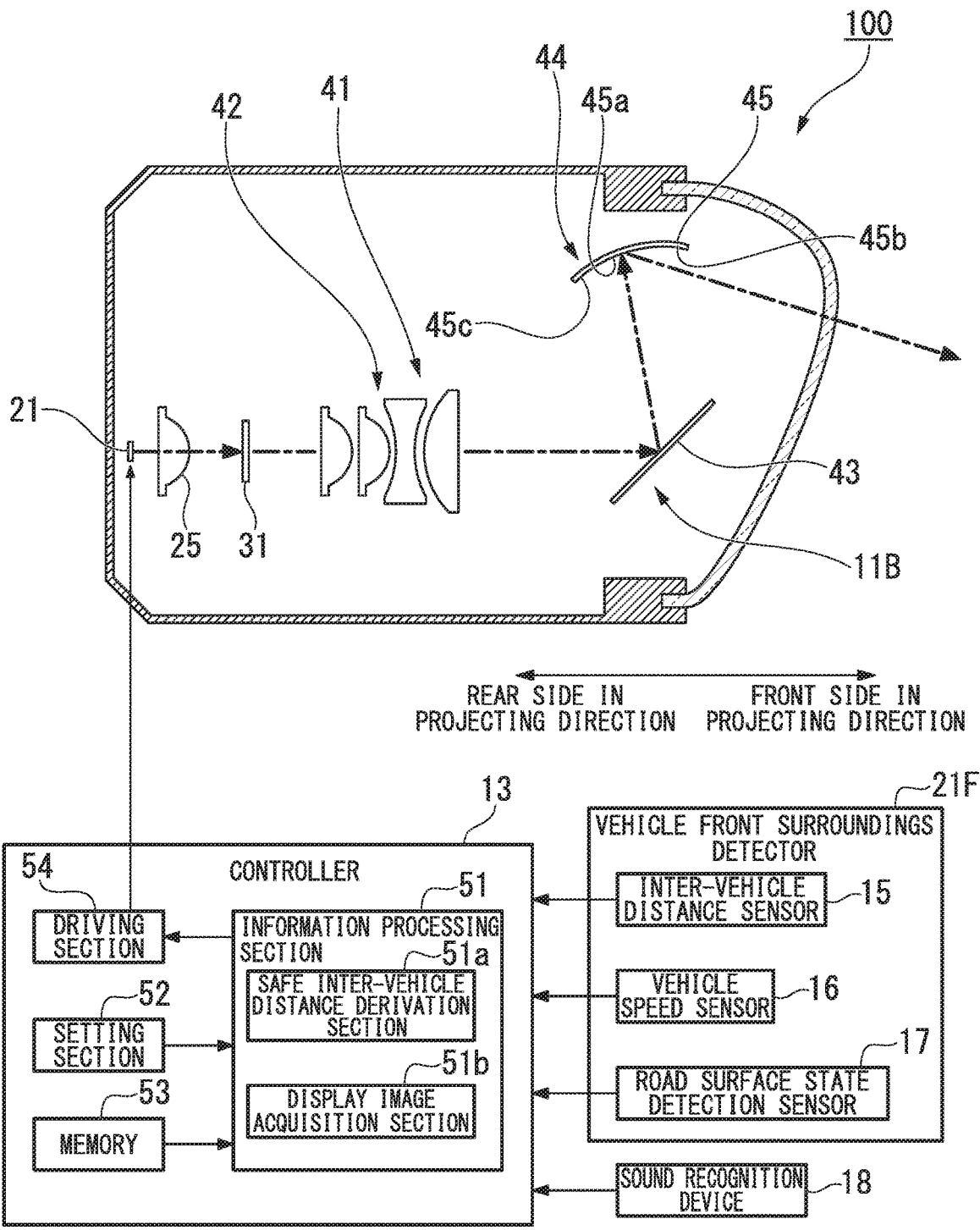
FIG. 12 is a view showing a projecting module of a variant that can be employed in the first embodiment.

FIG. 12 is a view showing a projecting module 11B of a variant that can be employed in the first embodiment. The projecting module 11B is distinguished from that of the above-mentioned first embodiment in that the image generating section 31 is an example of a transmissive type and constituted by a liquid crystal display.

According to the display device 100 for a vehicle of the embodiment, the display device 100 for a vehicle determines a safe inter-vehicle distance according to a relative speed between the automobile 1 and the preceding vehicle 2 and a speed of the automobile 1. The display device 100 for a vehicle includes a reflecting section with a curvature according to a position on a road surface to which light having an image generated by the image generating section 31 is projected. The display device 100 for a vehicle varies the position on the road surface to which the image is projected by reflecting the light having the image using different portions of the reflecting section. Since the reflecting section 45 configured to reflect the light having the reflection pattern 39 toward the road surface 57 is formed to continuously vary a curvature according to a distance from a projection target (from the vicinity of the vehicle on the road surface to a side far from the vehicle), a high quality image in which defocusing does not occur can be clearly displayed on the road surface 57. For this reason, an image according to the inter-vehicle distance between the automobile and the preceding vehicle 2 can be drawn on the road surface drawing, and accidents due to collision of the vehicle can be reduced. While a drawing position on a road surface with respect to the automobile 1 varies according to an environment, a radiation image can be focused without blurring even when the image is drawn at any position on the road surface.

In addition, according to the display device 100 for a vehicle of the first embodiment, since the light from the condensing optical system 42 is reflected by the reflecting mirror 43 toward the reflecting section 45, there is no need to dispose the condensing optical system 42 in a direction facing the reflecting section 45. Accordingly, a thickness of the condensing optical system 42 in the vertical direction can be reduced and a size of the headlight'section 10 in the vertical direction can be reduced. Accordingly, a size of the housing of the headlight section 10 can be easily reduced.

<Configuration Example>

As a configuration example, a display section for a vehicle (in the example, the controller 13 of the display device 100 for a vehicle) including a light source (in the example, the light source 21), an image generating section (in the example, the image generating section 31) configured to modulate light emitted from the light source using an image according to an inner-vehicle distance between a host vehicle and a preceding vehicle and generate an image according to the inter-vehicle distance, a condensing optical system (in the example, the condensing optical system 42) configured to condense light having the image according to the inter-vehicle distance generated by the image generating section, and a reflecting section (in the example, the reflecting section 45) configured to reflect the light condensed by the condensing optical system to project the light to the road surface, wherein the reflecting section has a reflecting surface with a curvature that gradually increases form a rear side in a projecting direction toward a front side in the projecting direction, is provided.

As a configuration example, an inter-vehicle distance sensor (in the example, the inter-vehicle distance sensor 15) configured to derive an inter-vehicle distance between a host vehicle (in the example, the automobile 1) and a preceding vehicle (in the example, the preceding vehicle 2), a vehicle speed sensor (in the example, the vehicle speed sensor 16) configured to derive a speed of the host vehicle, and a controller (in the example, the controller 13) configured to acquire information showing a safe inter-vehicle distance between the host vehicle and the preceding vehicle on the basis of the inter-vehicle distance and the speed of the host vehicle are provided, and the image generating section generates an image representing a safe inter-vehicle distance on the basis of the information showing the safe inter-vehicle distance acquired by the controller.

As a configuration example, the controller derives a relative speed of the host vehicle with respect to the preceding vehicle on the basis of the inter-vehicle distance and the speed of the host vehicle, and acquires information showing a safe inter-vehicle distance as an image according to the derived relative speed.

As a configuration example, the controller acquires information showing a safe inter-vehicle distance as an image according to the inter-vehicle distance when a distance between the host vehicle and the preceding vehicle is larger than a threshold (in the example, a lamp lights-out distance).

As a configuration example, a road, surface state detection sensor (in the example, the road surface state detection sensor 17) configured to detect a road surface state in which the host vehicle travels is provided, and the controller acquires information showing a safe inter-vehicle distance also on the basis of the road surface state detected by the road surface state detection sensor.

As a configuration example, a setting section (in the example, the setting section 52) configured to perform permission or prohibition of generation of an image according to the inter-vehicle distance by the image generating section is provided, and the image generating section generates art image representing an inter-vehicle distance when the setting section permits generation of the image according to the inter-vehicle distance.

As a configuration example, when the light source is a laser, the controller has a function of predicting whether the host vehicle collide with the preceding vehicle, and when a collision is predicted, the light source is turned off.

Second Embodiment

FIG. 1 can be applied to a schematic configuration of an automobile 1*a* according to a second embodiment. FIG. 2 can be applied to a front portion of the automobile 1*a* to which a lighting device according to the second embodiment is applied.

FIG. 13 is a schematic view of a display device 100*a* for a vehicle according to the second embodiment.

Figure 14:
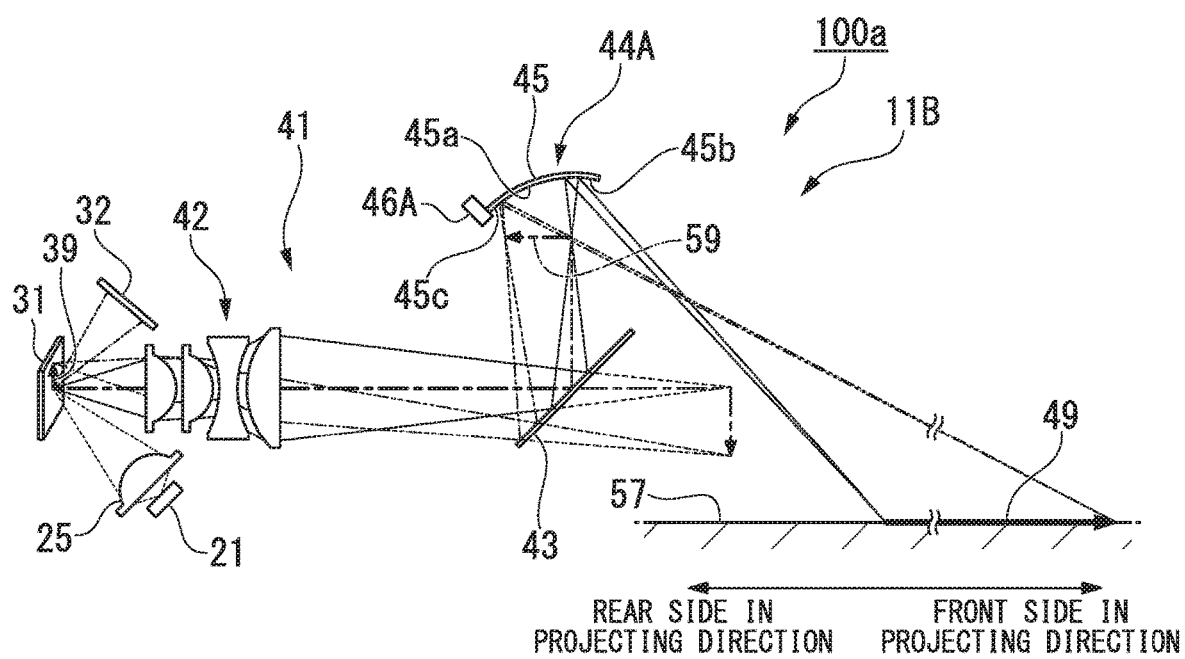
FIG. 14 is a schematic view showing a projecting module according to the second embodiment.

FIG. 14 is a schematic view showing a projecting module 11B of the second embodiment.

The display device 100*a* for a vehicle according to the second embodiment is distinguished from the display device 100 for a vehicle according to the first embodiment in that, in the display device 100 for a vehicle according to the second embodiment, a switching section 46A is provided, a reflecting apparatus 44A is provided instead of the reflecting apparatus 44, a controller 13*a* is provided instead of the controller 13, and a driving section 54*a* is provided instead of the driving section 54.

The reflecting apparatus 44A has a plurality of (in the embodiment, three) reflecting sections 45, and a switching section 46A.

The switching section 46A is switched to a light receiving position at which light radiated from the condensing optical system 42 is received in any one of the three reflecting sections 45 according to the control by the driving section 54*a*.

Figure 15:
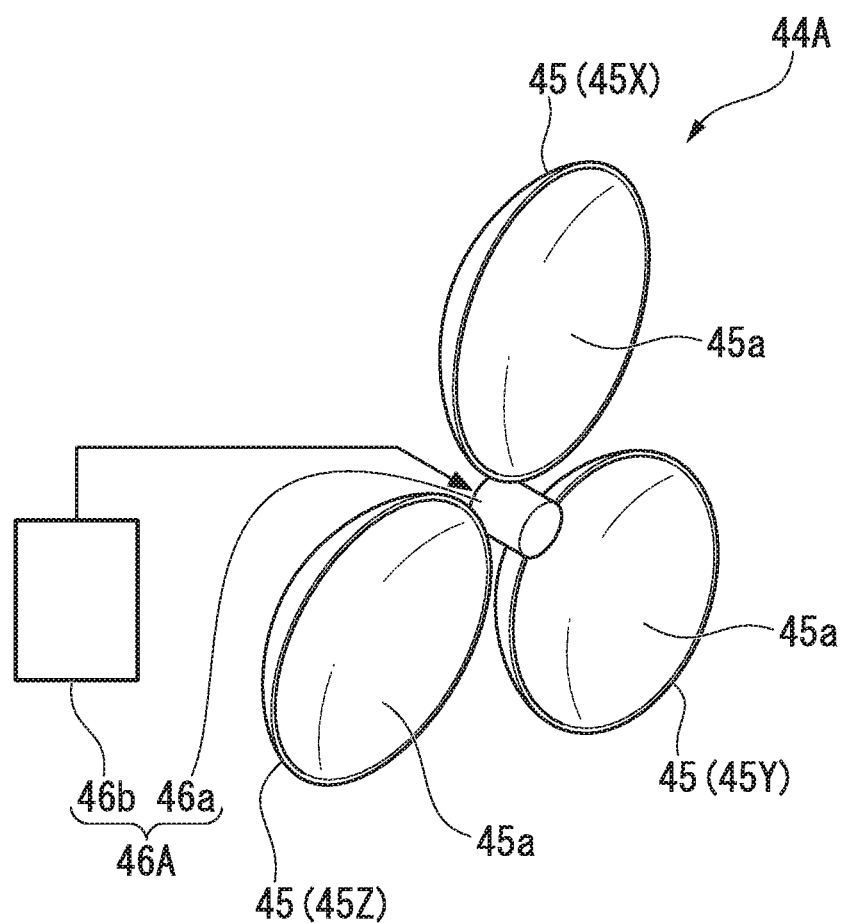
FIG. 15 is a perspective view of a reflecting apparatus of the second embodiment.

FIG. 15 is a perspective view of the reflecting apparatus 44A of the second embodiment.

The reflecting apparatus 44A has the plurality of (in the embodiment, three) reflecting sections 45, and the switching section 46A.

The reflecting section 45 reflects light condensed by the condensing optical system 42 toward the road surface 57.

The reflecting section 45 is a concave surface reflector for enlargement projection. The reflecting section 45 has a reflecting surface 45*a*. The reflecting section 45 reflects light condensed by the condensing optical system 42 at the reflecting surface 45*a* to project the light to a predetermined region of the road surface 57. The reflecting surface 45*a* has a concave surface shape constituted by a free curved surface of a non-spherical surface.

The reflecting surface 45*a* is disposed at the following stage of the intermediate image 59 formed by the condensing optical system 42. Accordingly, light is imaged in the preceding stage of the reflecting surface 45*a*, enters the reflecting surface 45*a* having a concave surface shape while spreading in a diffusion direction, and is condensed again by reflecting the light using the reflecting surface 45*a*.

The region 45*b* at front side of the reflecting surface 45*a* in the projecting direction reflects light toward the road surface 57 in the vicinity of the vehicle. In addition, the region 45*c* at a rear side of the reflecting surface 45*a* in the projecting direction reflects light toward the road surface 57 far side from the vehicle. The reflecting surface 45*a* is formed to continuously vary a curvature according to a distance from a projection target (from the vicinity of the vehicle on the road surface 57 to a side far from the vehicle) from the region 45*c* at a rear side in the projecting direction toward the region 45*b* at front side in the projecting direction. That is, the reflecting surface 45*a* has a curvature that gradually increases from a rear side m the projecting direction toward a front side in the projecting direction. Accordingly, in comparison with the region 45*c* at a rear side in the projecting direction from which a light is reflected toward a side far from the vehicle, in the region 45*b* at a front side in the projecting direction from which a light reflected toward the vicinity of the vehicle, a distance between the region from which light is reflected in the reflecting surface 45*a* and the region in which the light distribution pattern 49 is imaged on the road surface 57, which is an imaging surface of the road surface 57, can be shortened, out of focus of the imaged light distribution pattern 49 can be suppressed.

The switching section 46A has a shaft section 46*a*, and a driving section 46*b* configured to rotatably drive the shaft section 46*a* about an axial center. The plurality of reflecting sections 45 are fixed to the shaft section 46*a* at equal intervals in a circumferential direction with respect to the axial center of the shaft section 46*a*. The switching section 46A is disposed to switch one of the plurality of reflecting sections 45 to a light receiving position at which light radiated from the condensing optical system 42 according to rotation of the shaft section 46*a* by the driving section 46*b*.

Further, in FIG. 13 and FIG. 14, among the plurality of reflecting sections 45, only one reflecting section 45 disposed at a light receiving position is shown.

As shown in FIG. 15, the reflecting apparatus 44A of the embodiment has a reflecting section 45X for a short range, a reflecting section 45Y for an intermediate range, and a reflecting section 45Z for a long range. The reflecting surfaces 45*a* of the reflecting sections 45X, 45Y and 45Z are set to reflect light toward regions on the road surface 57 having different distances from each other. The reflecting surfaces 45*a* of the reflecting section 45X for a short range, the reflecting section 45Y for an intermediate range and the reflecting section 45Z for a long range are formed as curved surfaces having an average curvature that is increased as a distance to which the reflected light is radiated is closer to the sections.

Further, in sequence of the reflecting section 45X for a short range, the reflecting section 45Y for an intermediate range and the reflecting section 45Z for a long range, a distance to which the reflected light is radiated is designed to be closer to the sections.

The controller 13*a* will be described.

The driving section 54*a* of the controller 13*a* performs the following processing when information showing a display image output from the display image acquisition section 51*b* is information showing a display image representing the safe inter-vehicle distance and information showing a drawing distance shows a safe inter-vehicle distance.

The driving section 54a turns on the light source 21, outputs a display image representing a safe inter-vehicle distance to the image generating section 31, and outputs a control signal of switching to a reflecting section in which light from the condensing optical system 42 is reflected to a road surface separated by a safe inter-vehicle distance from a side in front of the automobile 1a, among the reflecting sec 45X for a short image, the reflecting section 45Y for an intermediate range and the reflecting section 45Z for a long range, to the switching section 46A. The reflecting section in which the light from the condensing optical system 42 is reflected to a road surface separated by a safe inter-vehicle distance from a side in front of the automobile 1a is previously adjusted. The safe inter-vehicle distance is a distance that is smaller than an inter-vehicle distance between the host vehicle and the preceding vehicle 2. Accordingly, since the light from the condensing optical system 42 is reflected by the reflecting section, as shown in FIG. 8A, a display image is drawn on a road surface separated a safe inter-vehicle distance from a side in front of the automobile 1a. In the example shown in FIG. 8A, a display image representing a safe inter-vehicle distance is represented with hatching in a direction of advance of the vehicle. A driver can hold a safe inter-vehicle distance by being aware that the display image is not radiated to a rear section of the preceding vehicle.

The driving section 54a performs the following processing when information showing a display image output from the display image acquisition section 51b is a display image representing a warning display, and information showing a drawing distance shows a drawing distance that is a distance larger than a lamp lights-out distance and a distance that is a safe inter-vehicle distance or smaller.

The driving section 54a turns on the light source 21, outputs information showing a display image representing a warning display to the image generating section 31, and outputs a control signal of switching to a reflecting section in which light from the condensing optical system 42 is reflected to a road surface separated a safe inter-vehicle distance from a side in front of the automobile 1a, among the reflecting section 45X for a short range, the reflecting section 45Y for an intermediate range and the reflecting section 45Z for a long range, to a switching section 46. The reflecting section in which the light from the condensing optical system 42 is reflected to the road surface separated a safe inter-vehicle distance from a side in front of the automobile 1a is previously adjusted. Accordingly, since the light from the condensing optical system 42 is reflected by the region, as shown in FIG. 8B, a display image is drawn on a road surface separated a safe inter-vehicle distance from a side in front of the automobile 1a. In the example shown in FIG. 8B, a display image representing a warning display is displayed with hatching in a direction of advance of the vehicle.

The driving section 54a performs the following processing when the display image acquisition section 51b outputs a command of turning off the light source.

The driving section 54a turns off the light source 21. Accordingly, as shown in FIG. 8C, a display image is not drawn.

FIG. 9 can be applied to an example of a display image displayed on a road surface by the display device 100a for a vehicle according to the second embodiment.

[Example of Procedure of Road Surface Drawing Processing]

Figure 16:
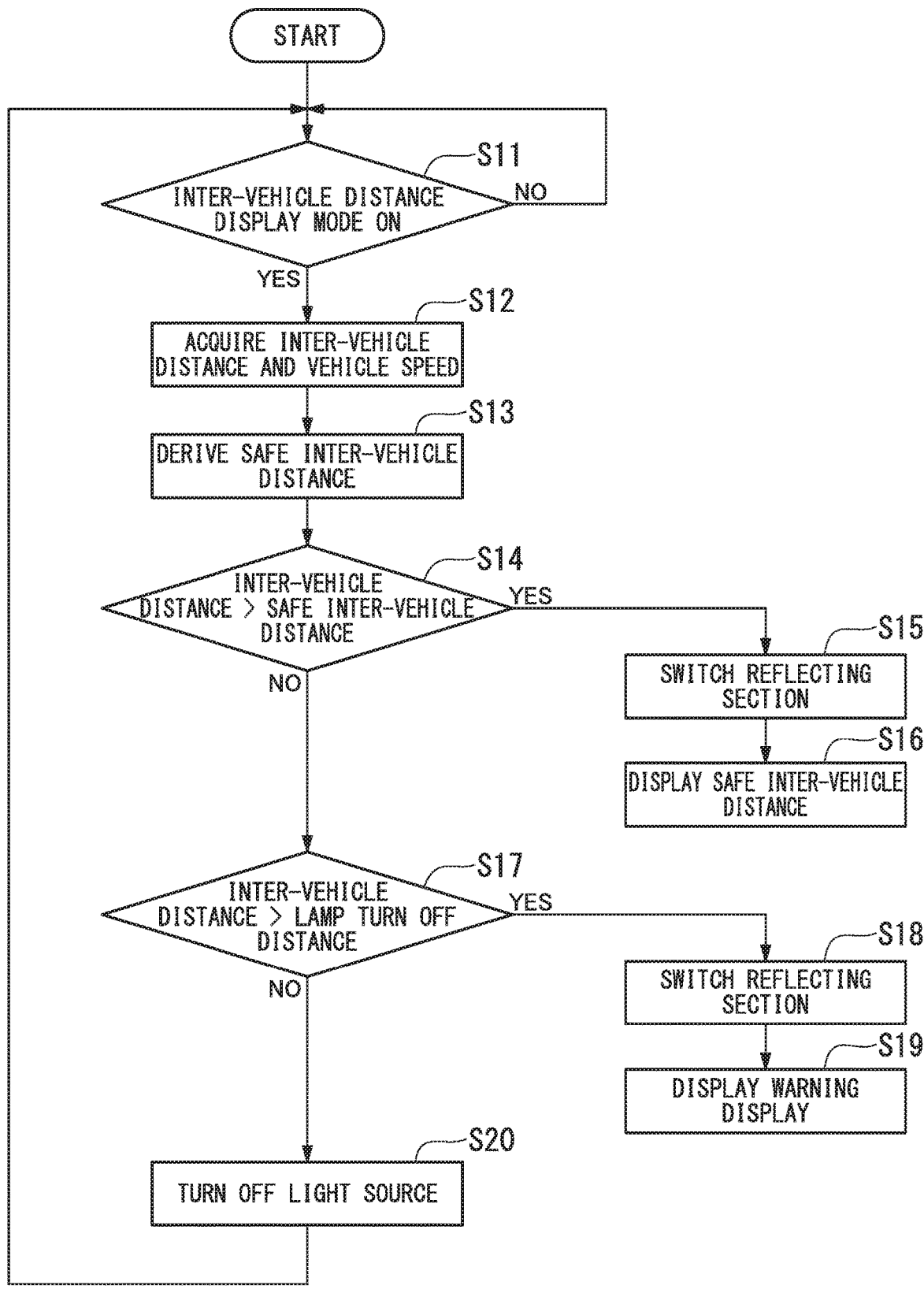
FIG. 16 is a flowchart showing an example of a procedure of road surface drawing processing of a display device for a vehicle provided in an automobile according to the second embodiment.

FIG. 16 is a flowchart showing an example of a procedure of road surface drawing processing of the display device 100a for a vehicle provided in the automobile 1a according to the second embodiment.

In the example, it is assumed that a certain person sits on a driver's seat in the automobile 1a as a driver.

Steps S11 to S14 can apply steps S1 to S4 described with reference to FIG. 10.

(Step S15)

The display image acquisition section 51b acquires information showing a display image representing a safe inter-vehicle distance from the memory 53 when the determined inter-vehicle distance is larger than the safe inter-vehicle distance, and outputs the information showing the display image representing the acquired safe inter-vehicle distance and the information showing the drawing distance (here, the safe inter-vehicle distance) to the driving section 54a.

The driving section 54a switches any one of the three reflecting sections 45 of the reflecting apparatus 44A to a light receiving position, at which light radiated from the condensing optical system 42 is received, on the basis of the information showing the drawing distance.

(Step S16)

The driving section 54a draws a display image representing a safe inter-vehicle distance on a road surface separated a drawing distance from a side in front of the automobile 1a by driving the light source 21 on the basis of the information showing the display image representing the safe inter-vehicle distance.

(Step S17)

In step S14, the display image acquisition section 51b determines whether the inter-vehicle distance is larger than the lamp lights-out distance when the determined inter-vehicle distance is the safe inter-vehicle distance or smaller.

(Step S18)

The display image acquisition section 51b acquires information showing a display image representing a warning display from the memory 53 when it is determined that the inter-vehicle distance is larger than the lamp lights-out distance, and outputs the information showing the display image representing the acquired warning display and the information showing the drawing distance (here, the safe inter-vehicle distance) to the driving section 54a.

The driving section 54a switches any one of the three reflecting sections 45 of the reflecting apparatus 44A to a light receiving position, at which light radiated from the condensing optical system 42 is received, on the basis of the information showing the drawing distance.

(Step S19)

The driving section 54a draws a display image representing a warning display on a road surface separated a safe inter-vehicle distance from a side in front of the automobile 1a by driving the light source 21 and the image generating section 31 on the basis of the information showing the display image.

(Step S20)

In step S17, when the display image acquisition section 51b determines that the inter-vehicle distance is the lamp lights-out distance or smaller, the display image acquisition section 51b creates a command of turning off the light source 21, and outputs the created command of turning off the light source 21 to the driving section 54a.

The driving section 54a turns off the light source 21 on the basis of the command of turning off the light source output from the display image acquisition section 51l.

After processing of step S20 is terminated, the procedure is shifted to step S11.

In a flowchart shown in FIG. 16, processing of steps S14 to S20 may be interchanged. Specifically, before comparing the inter-vehicle distance with the safe inter-vehicle distance, the inter-vehicle distance and the lamp lights-out distance may be compared.

In the above-mentioned second embodiment, while the case in which both of the left road surface drawing section 20L and the right road surface drawing section 20R draw a display image representing a safe inter-vehicle distance or a display image representing a warning display on a road surface has been described, there is no limitation thereto. For example, the left road surface drawing section 20L or the right road surface drawing section 20R may draw a display image representing a safe inter-vehicle distance or a display image representing a warning display on a road surface, or any one or both of the left headlight 14L and the right headlight 14R may draw a display image representing a safe inter-vehicle distance or a display in representing a warning display on a road surface.

In the above-mentioned second embodiment, while the case in which a display image is drawn on a road surface by the road surface drawing section 20 or a display image is not drawn on a road surface on the basis of the operation instruction obtained from a result of voice recognition by the sound recognition device 18 has been described, there is no limitation thereto. For example, when a driver performs a certain operation, the controller 13a may cause the left road surface drawing section 20L or the right road surface drawing section 20R to draw a display image on a road surface or not to draw a display image on a road surface.

In addition, when some conditions are satisfied, the controller 13a may automatically cause the left road surface drawing section 20L or the right road surface drawing section 20R to draw a display image on a road surface. When some conditions are not satisfied, the controller 13a may automatically cause the left road surface drawing section 20L or the right road surface drawing section 20R not to draw a display image on a road surface.

In the above-mentioned second embodiment, while the case in which the information processing section 51 causes the road surface drawing section 20 to draw a display image on a road surface on the basis of the control information for drawing various display images stored in the memory 53, the information showing the inter-vehicle distance output from the inter-vehicle distance sensor 15, the information showing the vehicle speed of the automobile 1a output from the vehicle speed sensor 16 and the information showing the road surface state output from the road surface state detection sensor 17 has been described, there is no limitation thereto. For example, when the information processing section 51 causes the road surface drawing section 20 to draw a display image on a road surface without using the information showing the road surface state, the information processing section 51 may cause the road surface drawing section 20 to draw a display image on a road surface on the basis of the control information for drawing various display images stored in the memory 53, the information showing the inter-vehicle distance output from the inter-vehicle distance sensor 15 and the information showing the vehicle speed of the automobile 1a output from the vehicle speed sensor 16. According to the above-mentioned configuration, a processing load of the information processing section 51 can be reduced.

In the above-mentioned second embodiment, while the case in which the information obtained by associating the relative speed and the safe inter-vehicle distance corresponds to a case in which a road surface is a dry state has been described, there is no limitation thereto. For example, when a road surface situation is a half wet state or a wet state, the embodiment can, also be applied to the case in which the road surface situation is snow-packed state, a compacted snow state, a frozen state or a slush state.

In the above-mentioned second embodiment, the case in which the command of turning off the light source 21 is created and the created command of turning off the light source 21 is output to the driving section 54a when it is determined that the inter-vehicle distance is the lamp lights-out distance or smaller has been described, there is no limitation thereto. For example, when it is determined that the inter-vehicle distance is the lamp lights-out distance or smaller and the road surface drawing section 20 is constituted by a laser light source, a command of turning off the light source 21 may be created, and the created command of turning off the light source 21 may be output to the driving section 54a. According to the above-mentioned configuration, exposure of laser light due to collision with and damage to the road surface drawing section 20 of the display device 100a for a vehicle can be prevented. In addition, the display image acquisition section 51b of the controller 13a has a function of predicting whether the host vehicle will collide with the preceding vehicle, a command of turning off the light source 21 is created when a collision is predicted, and the created command of turning off the light source 21 may be output to the driving section 54a.

In the above-mentioned second embodiment, while the case in which the reflecting apparatus 44A includes the plurality of (in the embodiment, three) reflecting sections 45 has been described, there is no limitation thereto. For example, the reflecting apparatus 44A may include two reflecting sections 45 or may include four or more reflecting sections 45.

In the above-mentioned second embodiment, while the case in which the display image representing the safe inter-vehicle distance or the display image representing the warning display is represented at a position of a bold line extending in a direction perpendicular to a direction of advance of the vehicle, and is represented so that characters, a position, a pattern, or the like, is changed through a difference in contrast, characters or the like, a diagram, a symbol or the like, or the bold line extending in the perpendicular direction is moved with respect to a direction of advance of the vehicle, has been described, there is no limitation thereto. For example, the display image may be represented by changing a color or the like.

In the above-mentioned second embodiment, the reflecting mirror 43 may be omitted.

Figure 17:
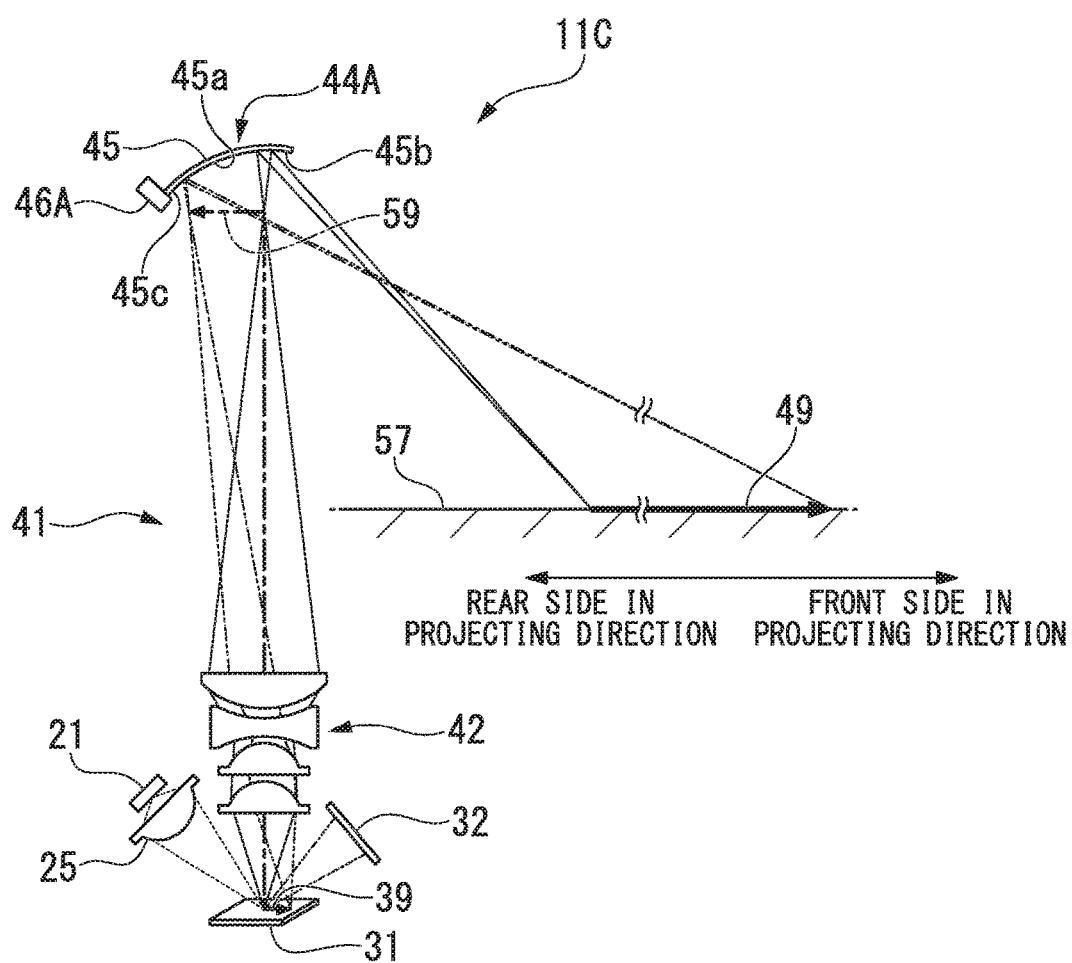
FIG. 17 is a view showing a projecting module of a variant that can be employed in the second embodiment.

FIG. 17 is a view showing the projecting module 11C of a variant that can be employed to the second embodiment. The projecting module 11C is distinguished from that of the above-mentioned second embodiment in that the reflecting mirror 43 is not provided. According to the variant, it is possible to provide an inexpensive display device 100a for a vehicle by reducing the number of parts.

In the above-mentioned second embodiment, while the case in which the image generating section 31 is a reflective type has been described, there is no limitation thereto. For example, the image generating section 31 may be a transmissive type.

Figure 18:
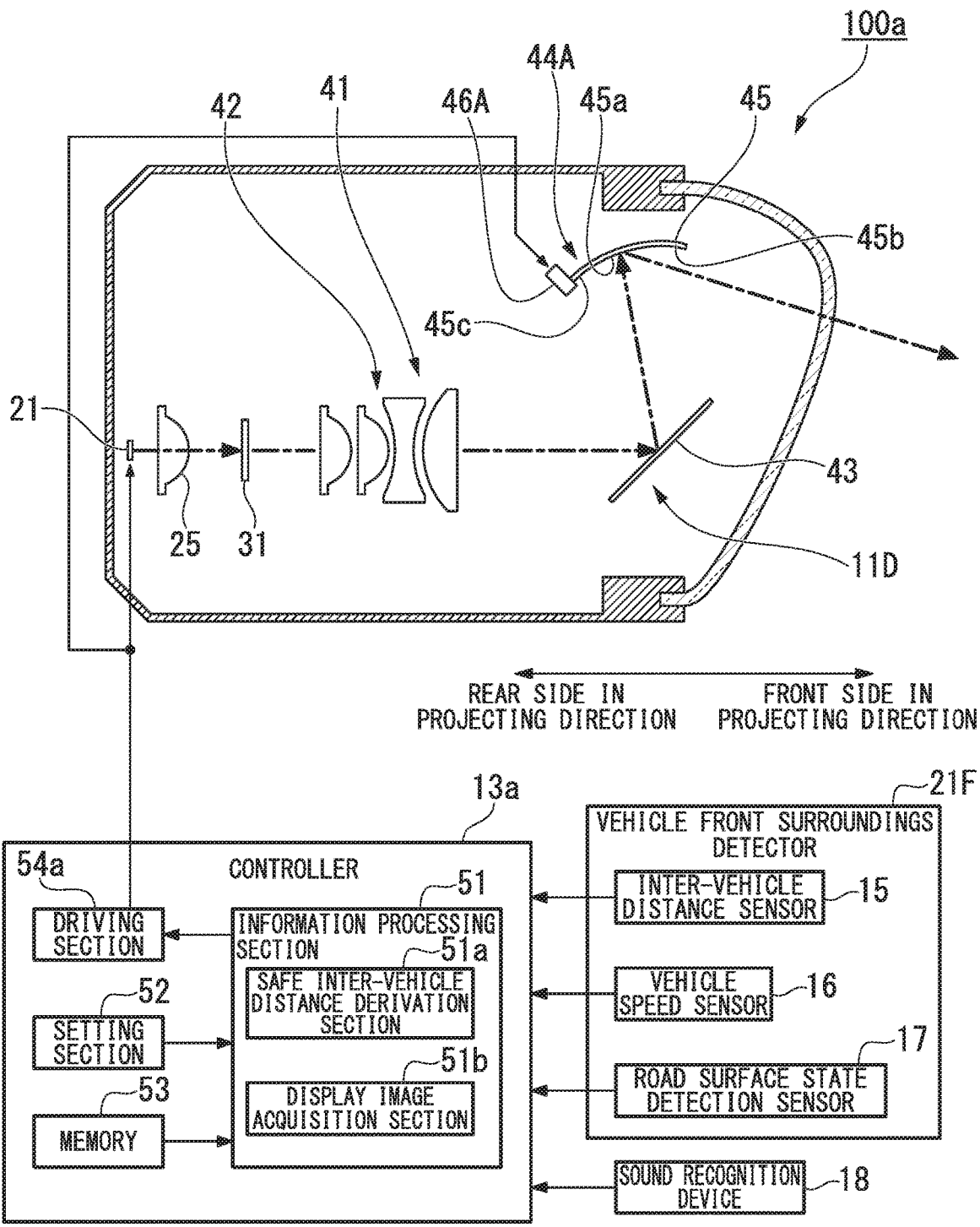
FIG. 18 is a view showing a projecting module of a variant that can be employed in the second embodiment.

FIG. 18 is a view showing the projecting module 11D of a variant that can be employed to the second embodiment. The projecting module 11D is distinguished from that of the above-mentioned second embodiment in that the image generating section 31, which is an example of a transmissive type, is constituted by a liquid crystal display.

According to the display device 100a for a vehicle of the embodiment, the display device 100a for a vehicle determines a safe inter-vehicle distance using a relative speed between the automobile 1a and the preceding vehicle 2 and a speed of the automobile 1a. The display device 100a for a vehicle has a reflecting section configured to reflect light having an image generated by the image generating section 31 and have different curvatures according to positions on a road surface to which the image is projected. The display device 100a for a vehicle varies a position on a road surface to which an image is projected by reflecting light having the image using portions having different reflecting sections. Since the reflecting section 45 configured to reflect the light having the reflection pattern 39 toward the road surface 57 is formed to continuously vary a curvature according to a distance from a projection target (from the vicinity of the vehicle on the road surface to a side far from the vehicle), a high quality image in which defocusing does not occur can be clearly displayed on the road surface 57. For this reason, since the image is drawn on the road surface according to the inter-vehicle distance between the automobile 1a and the preceding vehicle 2, accidents due to collision with the vehicle can be reduced. While a drawing position on the road surface with respect to the automobile 1a varies according to an environment, it is possible to focus the irradiation image without blurring the irradiation image at any position on the road surface.

In addition, according to the display device 100a for a vehicle of the second embodiment, the plurality of reflecting sections 45 configured to reflect the image toward regions having different distances from each other can be switched by the switching section 46A and disposed at a light receiving position. By switching the reflecting sections 45 according to applications, it is possible to clearly display the image at a position suitable for each application.

In addition, according to the display device 100a for a vehicle of the second embodiment, since the light from the condensing optical system 42 is reflected by the reflecting mirror 43 toward the reflecting section 45, there is a need to dispose the condensing optical system 42 in a direction hieing the reflecting section 45. Accordingly, a thickness of the condensing optical system 42 in the vertical direction can be reduced and a size of the headlight section 10 in the vertical direction can be reduced. Accordingly, a size of a housing of the headlight section 10 can be easily reduced.

<Configuration Example>

As a configuration example, a light source (in the example, the light source 21), an image generating section (in the example, the image generating section 31) configured to modulate light emitted from the light source using an image according to an inter-vehicle distance between the host vehicle and the preceding vehicle and generate an image according to the inter-vehicle distance, a condensing optical system (in the example, the condensing optical system 42) configured to condense light having an image according to the inter-vehicle distance generated by the image generating section, and a reflecting section (in the example, the reflecting section 45) configured to reflect light condensed by the condensing optical system and project the light to a road surface are provided, and the reflecting section is a display section for a vehicle (in the example, the controller 13a of the display device 100a for a vehicle) having a reflecting surface with a curvature that gradually increases from a rear side in a projecting direction toward a front side in the projecting direction.

As a configuration example, an inter-vehicle distance sensor (in the example, the inter-vehicle distance sensor 15) configured to derive an inter-vehicle distance between a host vehicle (in the example, the automobile 1a) and a preceding vehicle (in the example, the preceding vehicle 2), a vehicle speed sensor (in the example, the vehicle speed sensor 16) configured to derive a speed of the host vehicle, and a controller (in the example, the controller 13a) configured to acquire information showing a safe inter-vehicle distance between the host vehicle and die preceding vehicle on the basis of the inter-vehicle distance and the speed of the host vehicle are provided, and the image generating section generates an image representing a safe inter-vehicle distance on the basis of the information showing the safe inter-vehicle distance acquired by the controller.

As a configuration example, the controller derives a relative speed of the host vehicle with respect to the preceding vehicle on the basis of the inter-vehicle distance and the speed of the host vehicle, and acquires the information showing the safe inter-vehicle distance as an image according to the derived relative speed.

As a configuration example, the controller acquires information showing a safe inter-vehicle distance as an image according to the inter-vehicle distance when a distance (in the example, the lamp lights-out distance) between the host vehicle and the preceding vehicle is larger than a threshold.

As a configuration example, a road surface state detection sensor (in the example, the road surface state detection sensor 17) configured to detect a state of a road surface on which the host vehicle travels is provided, and the controller acquires information showing a safe inter-vehicle distance also on the basis of the road surface state detected by the road surface state detection sensor.

As a configuration example, a plurality of reflecting sections (in the example, the reflecting sections 45) configured to reflect an image toward regions on a road surface having different distances from each other, and a switching section (in the example, the switching section 46) configured to switch and to dispose one of the plurality of reflecting sections to a light receiving position of light radiated from the condensing optical system are provided, and the controller selects a reflecting section from the plurality of reflecting sections to be switched and to be disposed at a light receiving position of light radiated from the condensing optical system.

As a configuration example, a setting section (in the example, the setting section 52) configured to perform permission or prohibition of generation of an image according to the inter-vehicle distance by the image generating section is provided, and the image generating section generates an image representing an inter-vehicle distance when the setting section permits generation of an image according to the inter-vehicle distance.

As a configuration example, when the light source is a laser, the controller has a function of predicting whether the host vehicle will collide with the preceding vehicle, and turns off the light source when a collision is predicted.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered, as being limited by the foregoing description, and is only limited by the scope of the appended claims.

What is claimed is:

1. A display device for a vehicle comprising:
a light source;
an image generating section configured to modulate light emitted from the light source using an image according to an inter-vehicle distance between a host vehicle and a preceding vehicle and generate an image according to the inter-vehicle distance;
a condensing optical system configured to condense light having information representing the image according to the inter-vehicle distance generated by the image generating section; and
a reflecting section configured to reflect the light condensed by the condensing optical system and project the light to a road surface,
wherein the reflecting section has a reflecting surface with a curvature that gradually increases from a rear side in a projecting direction toward a front side in the projecting direction.

2. The display device for a vehicle according to claim 1, comprising:
an inter-vehicle distance sensor configured to derive an inter-vehicle distance between the host vehicle and the preceding vehicle;
a vehicle speed sensor configured to derive a speed of the host vehicle; and
a controller configured to acquire information showing a safe inter-vehicle distance between the host vehicle and the preceding vehicle on the basis of the inter-vehicle distance and the speed of the host vehicle,
wherein the image generating section generates an image representing the safe inter-vehicle distance on the basis of the information showing the safe inter-vehicle distance acquired by the controller.

3. The display device for a vehicle according to claim 2, wherein the controller derives a relative speed of the host vehicle with respect to the preceding vehicle on the basis of the inter-vehicle distance and the speed of the host vehicle, and acquires information showing a safe inter-vehicle distance as an image according to the derived relative speed.

4. The display device for a vehicle according to claim 2, wherein the controller acquires information showing a safe inter-vehicle distance as an image according to the inter-vehicle distance when a distance between the host vehicle and the preceding vehicle is larger than a threshold.

5. The display device for a vehicle according to claim 2, comprising a road surface state detection sensor configured to detect a state of a road surface on which the host vehicle travels,
wherein the controller acquires information showing a safe inter-vehicle distance also on the basis of the road surface state detected by the road surface state detection sensor.

6. The display device for a vehicle according to claim 2, comprising:
a plurality of reflecting sections configured to reflect light toward regions on a road surface having different distances from each other; and
a switching section configured to switch and to dispose one of the plurality of reflecting sections to a light receiving position of light radiated from the condensing optical system,
wherein the controller selects the reflecting section from the plurality of reflecting sections to be switched and to be disposed at the light receiving position of light radiated from the condensing optical system.

7. The display device for a vehicle according to claim 1, comprising a setting section configured to perform permission or prohibition of generation of an image according to the inter-vehicle distance by the image generating section,
wherein the image generating section generates an image representing the inter-vehicle distance when the setting section permits generation of the image according to the inter-vehicle distance.

8. The display device for a vehicle according to claim 2, wherein, when the light source is a laser, the controller has a function of predicting whether the host vehicle will collide with the preceding vehicle, and turns off the light source when a collision is predicted.

9. A display device for a vehicle comprising:
a light source;
an image generating section configured to modulate light emitted from the light source using an image according to an inter-vehicle distance between a host vehicle and a preceding vehicle and generate an image according to the inter-vehicle distance;
a condensing optical system configured to condense light having information representing the image according to the inter-vehicle distance generated by the image generating section;
a reflecting section configured to reflect the light condensed by the condensing optical system and project the light to a road surface,
an inter-vehicle distance sensor configured to derive an inter-vehicle distance between the host vehicle and the preceding vehicle;
a vehicle speed sensor configured to derive a speed of the host vehicle; and
a controller configured to acquire information showing a safe inter-vehicle distance between the host vehicle and the preceding vehicle on the basis of the inter-vehicle distance and the speed of the host vehicle,
wherein the reflecting section has a reflecting surface with a curvature that gradually increases from a rear side in a projecting direction toward a front side in the projecting direction,
wherein the image generating section generates an image representing the safe inter-vehicle distance on the basis of the information showing the safe inter-vehicle distance acquired by the controller,
wherein the controller is configured to derive a relative speed of the host vehicle with respect to the preceding vehicle on the basis of the inter-vehicle distance and the speed of the host vehicle, and
wherein, in a case in which the speed of the host vehicle is greater than the speed of the preceding vehicle, the controller is configured to acquire information for displaying the image representing the safe inter-vehicle distance at a position farther from the host vehicle compared to a case in which the speed of the host vehicle is lower than the derived speed of the preceding vehicle.

10. The display device for a vehicle according to claim 9, wherein the controller is configured to acquire information showing a safe inter-vehicle distance as an image according to the inter-vehicle distance when a distance between the host vehicle and the preceding vehicle is larger than a threshold, and
the controller is configured to output (i) the information for displaying the image representing the safe inter-vehicle distance on the road surface, and (ii) information for setting the safe inter-vehicle distance as a display position of the projected light, to the image generating section.

11. The display device for a vehicle according to claim 9, comprising a road surface state detection sensor configured to detect a state of a road surface on which the host vehicle travels,
   wherein the controller is configured to acquire information showing a safe inter-vehicle distance also on the basis of the road surface state detected by the road surface state detection sensor,
   the state of the road surface is classified into three types of (i) a dry state, (ii) a half wet or wet state, and (iii) a snow-packed state, a compacted snow state, a frozen state, or a slush state, and
   the controller is configured to set the safe inter-vehicle distance greater in the order of (i) a dry state, (ii) half wet state or wet state, and (iii) snow-packed state, a compacted snow state, a frozen state, or a slush state.

12. The display device for a vehicle according to claim 11, wherein the road surface state detection sensor includes at least one of an air temperature sensor, a humidity sensor, and a camera configured to detect visible light or infrared light.

13. The display device for a vehicle according to claim 9, comprising:
   a plurality of reflecting sections configured to reflect light toward regions on a road surface having different distances from each other; and
   a switching section configured to switch and to dispose one of the plurality of reflecting sections to a light receiving position of light radiated from the condensing optical system,
   wherein the controller is configured to select the reflecting section from the plurality of reflecting sections to be switched and to be disposed at the light receiving position of light radiated from the condensing optical system.

14. The display device for a vehicle according to claim 9, comprising a setting section configured to perform permission or prohibition of generation of an image according to the inter-vehicle distance by the image generating section,
   wherein the image generating section generates an image representing the inter-vehicle distance when the setting section permits generation of the image according to the inter-vehicle distance.

15. The display device for a vehicle according to claim 9, wherein the controller includes a display image acquisition section and a driving section that is configured to drive the light source, the image generating section and the reflecting section based on an output from the display image acquisition section,
   the display image acquisition section is configured to determine whether the inter-vehicle distance is greater than the safe inter-vehicle distance based on the information showing the safe inter-vehicle distance and the information showing the inter-vehicle distance, and
   the display image acquisition section is configured to output (i) the information showing the display image representing the safe inter-vehicle distance and (ii) information showing a display distance of the display image, to the driving section in a case in which the inter-vehicle distance is greater than the safe inter-vehicle distance.

16. The display device for a vehicle according to claim 15, wherein, in a case the display image acquisition section has determined that the inter-vehicle distance is smaller than the safe inter-vehicle distance, the display image acquisition section is configured to determine whether the inter-vehicle distance is greater than a predetermined distance at which a collision with the preceding vehicle and the host vehicle is inevitable, and
   the display image acquisition section is configured to output (i) information showing a display image representing a warning display informing a driver that the inter-vehicle distance is less than the safe inter-vehicle distance, and (ii) information showing a display distance of the display image, to the driving section in a case in which the inter-vehicle distance is greater than the predetermined distance at which the collision with the preceding vehicle and the host vehicle is inevitable.

17. The display device for a vehicle according to claim 15, wherein, in a case the display image acquisition section has determined that the inter-vehicle distance is less than the safe inter-vehicle distance, the display image acquisition section is configured to determine whether the inter-vehicle distance is greater than a predetermined distance at which a collision with the preceding vehicle and the host vehicle is inevitable, and
   the display image acquisition section is configured to output a command for turning off the light source to the driving section in a case in which the inter-vehicle distance is less than the predetermined distance at which the collision with the preceding vehicle and the host vehicle is inevitable.

18. The display device for a vehicle according to claim 9, wherein, when the light source is a laser, the controller is configured to predict whether the host vehicle will collide with the preceding vehicle, and to turn off the light source when a collision is predicted.

19. The display device for a vehicle according to claim 9, wherein the image generating section is constituted by a reflective digital light deflection device that includes a reflective control surface configured by arranging a plurality of mirror elements that are tiltable.

20. The display device for a vehicle according to claim 9, wherein the image generating section is constituted by a liquid crystal display.

* * * * *